US012419357B2

(12) United States Patent
Lee et al.

(10) Patent No.: US 12,419,357 B2
(45) Date of Patent: Sep. 23, 2025

(54) AEROSOL-GENERATING DEVICE

(71) Applicant: KT&G CORPORATION, Daejeon (KR)

(72) Inventors: Jongsub Lee, Sungnam-si (KR); Minkyu Kim, Seoul (KR); Jueon Park, Seoul (KR); Byungsung Cho, Gwangmyung-si (KR)

(73) Assignee: KT&G CORPORATION, Daejeon (KR)

(*) Notice: Subject to any disclaimer, the term of this patent is extended or adjusted under 35 U.S.C. 154(b) by 475 days.

(21) Appl. No.: 17/908,784

(22) PCT Filed: Feb. 7, 2022

(86) PCT No.: PCT/KR2022/001793
§ 371 (c)(1),
(2) Date: Sep. 1, 2022

(87) PCT Pub. No.: WO2022/169314
PCT Pub. Date: Aug. 11, 2022

(65) Prior Publication Data

US 2023/0098929 A1 Mar. 30, 2023

(30) Foreign Application Priority Data

Feb. 8, 2021 (KR) ........................ 10-2021-0017685

(51) Int. Cl.
*A24F 40/51* (2020.01)
*A24F 40/10* (2020.01)
(Continued)

(52) U.S. Cl.
CPC .............. *A24F 40/51* (2020.01); *A24F 40/10* (2020.01); *A24F 40/20* (2020.01); *A24F 40/30* (2020.01);
(Continued)

(58) Field of Classification Search
CPC .......... A24F 40/20; A24F 40/40; A24F 40/53; A24F 40/60
See application file for complete search history.

(56) References Cited

U.S. PATENT DOCUMENTS

| | | | |
|---|---|---|---|
| 10,463,073 | B1 | 11/2019 | Tang et al. |
| 10,820,626 | B2 | 11/2020 | Benjamignan et al. |
| 2015/0020831 | A1 | 1/2015 | Weigensberg et al. |
| 2019/0335807 | A1 | 11/2019 | Tang et al. |

(Continued)

FOREIGN PATENT DOCUMENTS

| | | |
|---|---|---|
| CN | 111712149 | 9/2020 |
| JP | H07-275144 | 10/1995 |

(Continued)

OTHER PUBLICATIONS

Lin, WO-2019080746-A1, machine translation relied upon for citations (Year: 2019).*

(Continued)

*Primary Examiner* — Michael H. Wilson
*Assistant Examiner* — Stephanie Lynn Moore
(74) *Attorney, Agent, or Firm* — LEE, HONG, DEGERMAN, KANG & WAIMEY

(57) ABSTRACT

An aerosol-generating device is disclosed. The aerosol-generating device of the present disclosure includes a door configured to open and close an insertion space into which a stick is inserted, a hinge member connected to the door to allow the door to be pivoted in the direction in which the stick is inserted, a magnetic body disposed at the door, a magnetic sensor configured to sense a magnetic field, and a controller configured to determine whether the stick is inserted into the insertion space using the magnetic sensor.

10 Claims, 15 Drawing Sheets

(51) Int. Cl.

| | |
|---|---|
| ***A24F 40/20*** | (2020.01) |
| ***A24F 40/30*** | (2020.01) |
| ***A24F 40/42*** | (2020.01) |
| ***A24F 40/44*** | (2020.01) |
| ***A24F 40/57*** | (2020.01) |
| *H01F 7/02* | (2006.01) |

(52) U.S. Cl.

CPC .............. *A24F 40/42* (2020.01); *A24F 40/44* (2020.01); *A24F 40/57* (2020.01); *H01F 7/02* (2013.01)

(56) References Cited

U.S. PATENT DOCUMENTS

| | | | | |
|---|---|---|---|---|
| 2019/0335811 | A1 | 11/2019 | Mead et al. | |
| 2020/0221782 | A1* | 7/2020 | Lim | H05B 1/0227 |
| 2020/0359696 | A1 | 11/2020 | Lim | |

FOREIGN PATENT DOCUMENTS

| | | | |
|---|---|---|---|
| JP | 2002-168060 | 6/2002 | |
| JP | 2020521438 | 7/2020 | |
| KR | 10-2018-0136249 | 12/2018 | |
| WO | 2019080746 | 5/2019 | |
| WO | WO-2019080746 A1 * | 5/2019 | A24F 47/008 |
| WO | 2019224120 | 11/2019 | |
| WO | 2020101213 | 5/2020 | |
| WO | 2020149505 | 7/2020 | |
| WO | 2020225105 | 11/2020 | |

OTHER PUBLICATIONS

The State Intellectual Property Office of the People's Republic of China Application Serial No. 202280003268.3, Office Action dated Jun. 27, 2024, 10 pages.

PCT International Application No. PCT/KR2022/001793, International Search Report dated May 20, 2022, 5 pages.

Korean Intellectual Property Office Application No. 10-2021-0017685, Office Action dated Jan. 13, 2023, 4 pages.

Japan Patent Office Application No. 2022-552533, Office Action dated Oct. 31, 2023, 3 pages.

European Patent Office Application Serial No. 22750063.4, Search Report dated Dec. 10, 2024, 10 pages.

* cited by examiner

AEROSOL-GENERATING DEVICE

CROSS-REFERENCE TO RELATED APPLICATIONS

This application is the National Stage filing under 35 U.S.C. 371 of International Application No. PCT/KR2022/001793, filed on Feb. 7, 2022, which claims the benefit of earlier filing date and right of priority to Korean Application No. 10-2021-0017685, filed on Feb. 8, 2021, the contents of which are all hereby incorporated by reference herein their entirety.

TECHNICAL FIELD

The present disclosure relates to an aerosol-generating device.

BACKGROUND ART

An aerosol-generating device is a device that extracts certain components from a medium or a substance by forming an aerosol. The medium may contain a multicomponent substance. The substance contained in the medium may be a multicomponent flavoring substance. For example, the substance contained in the medium may include a nicotine component, an herbal component, and/or a coffee component. Recently, various research on aerosol-generating devices has been conducted. Recently, various research on aerosol-generating devices has been conducted.

DISCLOSURE OF INVENTION

Technical Problem

It is an object of the present disclosure to solve the above and other problems.

It is another object of the present disclosure to provide an aerosol-generating device capable of rapidly determining whether a stick is inserted.

It is still another object of the present disclosure to provide an aerosol-generating device capable of automatically changing a mode depending on whether a stick is inserted.

Solution to Problem

An aerosol-generating device according to an aspect of the present disclosure for accomplishing the above and other objects may include a door configured to open and close an insertion space into which a stick is inserted, a hinge member connected to the door to allow the door to be pivoted in the direction in which the stick is inserted, a magnetic body disposed at the door, a magnetic sensor configured to sense a magnetic field, and a controller configured to determine whether the stick is inserted into the insertion space using the magnetic sensor.

Advantageous Effects of Invention

According to at least one of embodiments of the present disclosure, it is possible to rapidly determine whether a stick is inserted into an insertion space before the stick is completely inserted based on a magnetic field sensed by a magnetic sensor.

According to at least one of embodiments of the present disclosure, it is possible to automatically release a standby mode at the time of insertion of the stick and to automatically enter the standby mode at the time of removal of the stick based on the magnetic field sensed by the magnetic sensor, thus reducing unnecessary consumption of power and improving user convenience.

Additional applications of the present disclosure will become apparent from the following detailed description. However, because various changes and modifications will be clearly understood by those skilled in the art within the spirit and scope of the present disclosure, it should be understood that the detailed description and specific embodiments, such as preferred embodiments of the present disclosure, are merely given by way of example.

BRIEF DESCRIPTION OF DRAWINGS

The above and other objects, features, and other advantages of the present disclosure will be more clearly understood from the following detailed description taken in conjunction with the accompanying drawings, in which.

BEST MODE FOR CARRYING OUT THE INVENTION

Figure 1:
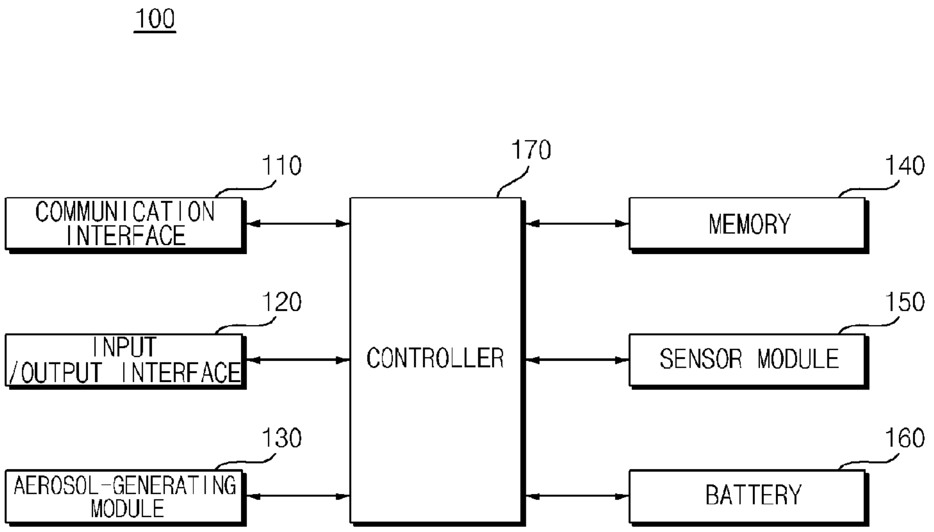
FIG. 1 is a block diagram of an aerosol-generating device according to an embodiment of the present disclosure.

Hereinafter, the embodiments disclosed in the present specification will be described in detail with reference to the accompanying drawings. The same or similar elements are denoted by the same reference numerals even though they are depicted in different drawings, and redundant descriptions thereof will be omitted.

In the following description, with respect to constituent elements used in the following description, the suffixes "module" and "unit" are used only in consideration of facilitation of description. The "module" and "unit" are do not have mutually distinguished meanings or functions.

In addition, in the following description of the embodiments disclosed in the present specification, a detailed description of known functions and configurations incorporated herein will be omitted when the same may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and sprit of the present disclosure.

It will be understood that the terms "first", "second", etc., may be used herein to describe various components. However, these components should not be limited by these terms. These terms are only used to distinguish one component from another component.

It will be understood that when a component is referred to as being "connected to" or "coupled to" another component, it may be directly connected to or coupled to another component. However, it will be understood that intervening components may be present. On the other hand, when a component is referred to as being "directly connected to" or "directly coupled to" another component, there are no intervening components present.

As used herein, the singular form is intended to include the plural forms as well, unless the context clearly indicates otherwise.

FIG. 1 is a block diagram of an aerosol-generating device according to an embodiment of the present disclosure.

Referring to FIG. 1, an aerosol-generating device 100 may include a communication interface 110, an input/output interface 120, an aerosol-generating module 130, a memory 140, a sensor module 150, a battery 160, and/or a controller 170.

In one embodiment, the aerosol-generating device 100 may be composed only of a main body. In this case, components included in the aerosol-generating device 100 may be located in the main body. In another embodiment, the aerosol-generating device 100 may be composed of a cartridge, which contains an aerosol-generating substance, and a main body. In this case, the components included in the aerosol-generating device 100 may be located in at least one of the main body or the cartridge.

The communication interface 110 may include at least one communication module for communication with an external device and/or a network. For example, the communication interface 110 may include a communication module for wired communication, such as a Universal Serial Bus (USB). For example, the communication interface 110 may include a communication module for wireless communication, such as Wireless Fidelity (Wi-Fi), Bluetooth, Bluetooth Low Energy (BLE), ZigBee, or nearfield communication (NFC).

The input/output interface 120 may include an input device (not shown) for receiving a command from a user and/or an output device (not shown) for outputting information to the user. For example, the input device may include a touch panel, a physical button, a microphone, or the like. For example, the output device may include a display device for outputting visual information, such as a display or a light-emitting diode (LED), an audio device for outputting auditory information, such as a speaker or a buzzer, a motor for outputting tactile information such as haptic effect, or the like.

The input/output interface 120 may transmit data corresponding to a command input by the user through the input device to another component (or other components) of the aerosol-generating device 100. The input/output interface 120 may output information corresponding to data received from another component (or other components) of the aerosol-generating device 100 through the output device.

The aerosol-generating module 130 may generate an aerosol from an aerosol-generating substance. Here, the aerosol-generating substance may be a substance in a liquid state, a solid state, or a gel state, which is capable of generating an aerosol, or a combination of two or more aerosol-generating substances.

According to an embodiment, the liquid aerosol-generating substance may be a liquid including a tobacco-containing material having a volatile tobacco flavor component.

According to another embodiment, the liquid aerosol-generating substance may be a liquid including anon-tobacco material. For example, the liquid aerosol-generating substance may include water, solvents, nicotine, plant extracts, flavorings, flavoring agents, vitamin mixtures, etc.

The solid aerosol-generating substance may include a solid material based on a tobacco raw material such as a reconstituted tobacco sheet, shredded tobacco, or granulated tobacco. In addition, the solid aerosol-generating substance may include a solid material having a taste control agent and a flavoring material. For example, the taste control agent may include calcium carbonate, sodium bicarbonate, calcium oxide, etc. For example, the flavoring material may include a natural material such as herbal granules, or may include a material such as silica, zeolite, or dextrin, which includes an aroma ingredient.

In addition, the aerosol-generating substance may further include an aerosol-forming agent such as glycerin or propylene glycol.

The aerosol-generating module 130 may include at least one heater (not shown).

The aerosol-generating module 130 may include an electro-resistive heater. For example, the electro-resistive heater may include at least one electrically conductive track. The electro-resistive heater may be heated as current flows through the electrically conductive track. At this time, the aerosol-generating substance may be heated by the heated electro-resistive heater.

The electrically conductive track may include an electro-resistive material. In one example, the electrically conductive track may be formed of a metal material. In another example, the electrically conductive track may be formed of a ceramic material, carbon, a metal alloy, or a composite of a ceramic material and metal.

The electro-resistive heater may include an electrically conductive track that is formed in any of various shapes. For example, the electrically conductive track may be formed in any one of a tubular shape, a plate shape, a needle shape, a rod shape, and a coil shape.

The aerosol-generating module 130 may include a heater that uses an induction-heating method. For example, the induction heater may include an electrically conductive coil. The induction heater may generate an alternating magnetic field, which periodically changes in direction, by adjusting the current flowing through the electrically conductive coil. At this time, when the alternating magnetic field is applied to a magnetic body, energy loss may occur in the magnetic body due to eddy current loss and hysteresis loss. In addition, the lost energy may be released as thermal energy. Accordingly, the aerosol-generating substance located adjacent to the magnetic body may be heated. Here, an object that generates heat due to the magnetic field may be referred to as a susceptor.

Meanwhile, the aerosol-generating module 130 may generate ultrasonic vibrations to thereby generate an aerosol from the aerosol-generating substance.

The aerosol-generating device 100 may be referred to as a cartomizer, an atomizer, or a vaporizer.

The memory 140 may store programs for processing and controlling each signal in the controller 170, and may store processed data and data to be processed.

For example, the memory 140 may store applications designed for the purpose of performing various tasks that can be processed by the controller 170. The memory 140 may selectively provide some of the stored applications in response to the request from the controller 170.

For example, the memory 140 may store data on the operation time of the aerosol-generating device 100, the maximum number of puffs, the current number of puffs, the number of uses of battery 160, at least one temperature profile, the user's inhalation pattern, and data about charging/discharging. Here, "puff" means inhalation by the user. "inhalation" means the user's act of taking air or other substances into the user's oral cavity, nasal cavity, or lungs through the user's mouth or nose.

The memory 140 may include at least one of volatile memory (e.g. dynamic random access memory (DRAM), static random access memory (SRAM), or synchronous dynamic random access memory (SDRAM)), nonvolatile memory (e.g. flash memory), a hard disk drive (HDD), or a solid-state drive (SSD).

The sensor module 150 may include at least one sensor.

For example, the sensor module 150 may include a sensor for sensing a puff (hereinafter referred to as a "puff sensor"). In this case, the puff sensor may be implemented as a proximity sensor, a pressure sensor, a gyro sensor, an acceleration sensor, a magnetic field sensor, or the like.

For example, the sensor module 150 may include a sensor for sensing the temperature of the heater included in the aerosol-generating module 130 and the temperature of the aerosol-generating substance (hereinafter referred to as a "temperature sensor"). In this case, the heater included in the aerosol-generating module 130 may also serve as the temperature sensor. For example, the electro-resistive material of the heater may be a material having a predetermined temperature coefficient of resistance. The sensor module 150 may measure the resistance of the heater, which varies according to the temperature, to thereby sense the temperature of the heater.

For example, in the case in which the main body and/or the cartridge of the aerosol-generating device 100 is formed to allow a stick to be inserted thereinto, the sensor module 150 may include a sensor for sensing insertion of the stick (hereinafter referred to as a "stick detection sensor").

For example, in the case in which the aerosol-generating device 100 includes a cartridge, the sensor module 150 may include a sensor for sensing mounting/demounting of the cartridge and the position of the cartridge (hereinafter referred to as a "cartridge detection sensor").

In this case, the stick detection sensor and/or the cartridge detection sensor may be implemented as an inductance-based sensor, a capacitive sensor, a resistance sensor, or a Hall sensor (or Hall IC) using a Hall effect.

For example, the sensor module 150 may include a voltage sensor for sensing a voltage applied to a component (e.g. the battery 160) provided in the aerosol-generating device 100 and/or a current sensor for sensing a current.

The battery 160 may supply electric power used for the operation of the aerosol-generating device 100 under the control of the controller 170. The battery 160 may supply electric power to other components provided in the aerosol-generating device 100. For example, the battery 160 may supply electric power to the communication module included in the communication interface 110, the output device included in the input/output interface 120, and the heater included in the aerosol-generating module 130.

The battery 160 may be a rechargeable battery or a disposable battery. For example, the battery 160 may be a lithium-ion (Li-ion) battery, a lithium polymer (Li-polymer) battery or a lithium-ion phosphate battery. However, the present disclosure is not limited thereto. For example, the battery 160 may be a lithium cobalt oxide ($LiCoO_2$) battery, a lithium titanate battery, and the like.

The aerosol-generating device 100 may further include a battery protection circuit module (PCM) (not shown), which is a circuit for protecting the battery 160. The battery protection circuit module (PCM) may be disposed adjacent to the upper surface of the battery 160. For example, in order to prevent overcharging and overdischarging of the battery 160, the battery protection circuit module (PCM) may cut off the electrical path to the battery 160 when a short circuit occurs in a circuit connected to the battery 160, when an overvoltage is applied to the battery 160, or when an overcurrent flows through the battery 160.

The aerosol-generating device 100 may further include a charging terminal to which electric power supplied from the outside is input. For example, the charging terminal may be formed at one side of the main body of the aerosol-generating device 100. The aerosol-generating device 100 may charge the battery 160 using electric power supplied through the charging terminal. In this case, the charging terminal may be configured as a wired terminal for USB communication, a pogo pin, or the like.

The aerosol-generating device 100 may further include a power terminal (not shown) to which electric power supplied from the outside is input. For example, a power line may be connected to the power terminal, which is disposed at one side of the main body of the aerosol-generating device 100. The aerosol-generating device 100 may use the electric power supplied through the power line connected to the power terminal to charge the battery 160. In this case, the power terminal may be a wired terminal for USB communication.

The aerosol-generating device 100 may wirelessly receive electric power supplied from the outside through the communication interface 110. For example, the aerosol-generating device 100 may wirelessly receive electric power using an antenna included in the communication module for wireless communication. The aerosol-generating device 100 may charge the battery 160 using the wirelessly supplied electric power.

The controller 170 may control the overall operation of the aerosol-generating device 100. The controller 170 may be connected to each of the components provided in the aerosol-generating device 100. The controller 170 may transmit and/or receive a signal to and/or from each of the components, thereby controlling the overall operation of each of the components.

The controller 170 may include at least one processor. The controller 170 may control the overall operation of the aerosol-generating device 100 using the processor included therein. Here, the processor may be a general processor such as a central processing unit (CPU). Of course, the processor may be a dedicated device such as an application-specific integrated circuit (ASIC), or may be any of other hardware-based processors.

The controller 170 may perform any one of a plurality of functions of the aerosol-generating device 100. For example, the controller 170 may perform any one of a plurality of functions of the aerosol-generating device 100 (e.g. a preheating function, a heating function, a charging function, and a cleaning function) according to the state of each of the components provided in the aerosol-generating device 100 and the user's command received through the input/output interface 120.

The controller 170 may control the operation of each of the components provided in the aerosol-generating device 100 based on data stored in the memory 140. For example, the controller 170 may control the supply of a predetermined amount of electric power from the battery 160 to the aerosol-generating module 130 for a predetermined time based on the data on the temperature profile, and the user's inhalation pattern, which is stored in the memory 140.

The controller 170 may determine the occurrence or non-occurrence of a puff using the puff sensor included in the sensor module 150. For example, the controller 170 may check a temperature change, a flow change, a pressure change, and a voltage change in the aerosol-generating device 100 based on the values sensed by the puff sensor.

The controller 170 may determine the occurrence or non-occurrence of a puff based on the value sensed by the puff sensor.

The controller 170 may control the operation of each of the components provided in the aerosol-generating device 100 according to the occurrence or non-occurrence of a puff and/or the number of puffs. For example, the controller 170 may perform control such that the temperature of the heater is changed or maintained based on the temperature profile stored in the memory 140.

The controller 170 may perform control such that the supply of electric power to the heater is interrupted according to a predetermined condition. For example, the controller 170 may perform control such that the supply of electric power to the heater is interrupted when the stick is removed, when the cartridge is demounted, when the number of puffs reaches the predetermined maximum number of puffs, when a puff is not sensed during a predetermined period of time or longer, or when the remaining capacity of the battery 160 is less than a predetermined value.

The controller 170 may calculate the remaining capacity with respect to the full charge capacity of the battery 160. For example, the controller 170 may calculate the remaining capacity of the battery 160 based on the values sensed by the voltage sensor and/or the current sensor included in the sensor module 150.

The controller 170 may perform control such that electric power is supplied to the heater using at least one of a pulse width modulation (PWM) method or a proportional-integral-differential (PID) method.

For example, the controller 170 may perform control such that a current pulse having a predetermined frequency and a predetermined duty ratio is supplied to the heater using the PWM method. In this case, the controller 170 may control the amount of electric power supplied to the heater by adjusting the frequency and the duty ratio of the current pulse.

For example, the controller 170 may determine a target temperature to be controlled based on the temperature profile. In this case, the controller 170 may control the amount of electric power supplied to the heater using the PID method, which is a feedback control method using a difference value between the temperature of the heater and the target temperature, a value obtained by integrating the difference value with respect to time, and a value obtained by differentiating the difference value with respect to time.

Although the PWM method and the PID method are described as examples of methods of controlling the supply of electric power to the heater, the present disclosure is not limited thereto, and may employ any of various control methods, such as a proportional-integral (PI) method or a proportional-differential (PD) method.

Meanwhile, the controller 170 may perform control such that electric power is supplied to the heater according to a predetermined condition. For example, when a cleaning function for cleaning the space into which the stick 201 is inserted is selected in response to a command input by the user through the input/output interface 120, the controller 170 may perform control such that a predetermined amount of electric power is supplied to the heater.

FIGS. 2A to 4 are views for explaining the aerosol-generating device according to embodiments of the present disclosure.

According to various embodiments of the present disclosure, the aerosol-generating device 100 may include a main body 200 and/or a cartridge 300.

Figure 2A:
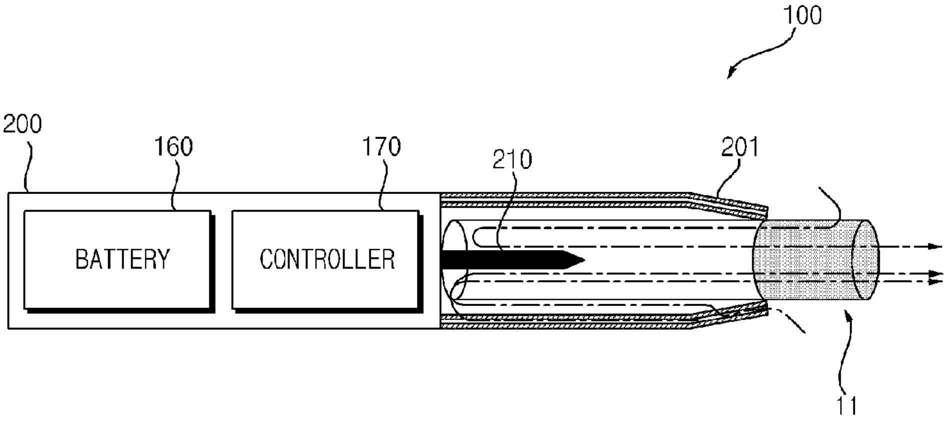
FIGS. 2A to 7C are views for explaining an aerosol-generating device according to embodiments of the present disclosure.

Referring to FIG. 2A, the aerosol-generating device 100 according to an embodiment may include a main body 200, which is formed such that a stick 11 can be inserted into the inner space formed by a housing 201.

The stick 11 may be similar to a general combustive cigarette. For example, the stick 11 may be divided into a first portion including an aerosol-generating substance and a second portion including a filter. Alternatively, the second portion of the stick 11 may also include an aerosol-generating substance. For example, a granular or capsular flavoring material may be inserted into the second portion.

The entirety of the first portion may be inserted into the aerosol-generating device 100. The second portion may be exposed to the outside. Alternatively, only a portion of the first portion may be inserted into the aerosol-generating device 100. Alternatively, the entirety of the first portion and a portion of the second portion may be inserted into the aerosol-generating device 100. The user may inhale the aerosol in the state of holding the second portion in the mouth. At this time, the aerosol may be generated as external air passes through the first portion. The generated aerosol may pass through the second portion to be introduced into the mouth of the user.

The main body 200 may be structured such that external air is introduced into the main body 200 in the state in which the stick 11 is inserted thereinto. In this case, the external air introduced into the main body 200 may flow into the mouth of the user via the stick 11.

When the stick 11 is inserted, the controller 170 may perform control such that electric power is supplied to the heater based on the temperature profile stored in the memory 140.

The heater may be disposed in the main body 200 at a position corresponding to the position at which the stick 11 is inserted into the main body 200. Although it is illustrated in the drawings that the heater is an electrically conductive heater 210 including a needle-shaped electrically conductive track, the present disclosure is not limited thereto.

The heater may heat the interior and/or exterior of the stick 11 using the electric power supplied from the battery 160. An aerosol may be generated from the heated stick 11. At this time, the user may hold one end of the stick 11 in the mouth to inhale the aerosol containing a tobacco material.

Meanwhile, the controller 170 may perform control such that electric power is supplied to the heater in the state in which the stick 11 is not inserted into the main body according to a predetermined condition. For example, when a cleaning function for cleaning the space into which the stick 11 is inserted is selected in response to a command input by the user through the input/output interface 120, the controller 170 may perform control such that a predetermined amount of electric power is supplied to the heater.

The controller 170 may monitor the number of puffs based on the value sensed by the puff sensor from the time point at which the stick 11 was inserted into the main body.

When the stick 11 is removed from the main body, the controller 170 may initialize the current number of puffs stored in the memory 140.

Figure 2B:
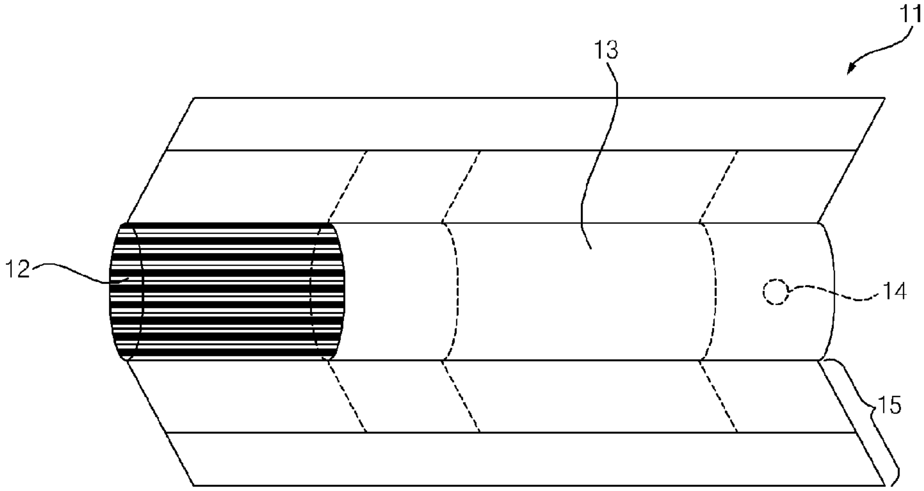

Referring to FIG. 2B, the stick 11 according to an embodiment may include a tobacco rod 12 and/or a filter rod 13. The first portion described above with reference to FIG. 2A may include the tobacco rod 12. The second portion described above with reference to FIG. 2A may include the filter rod 13.

Although it is illustrated in FIG. 2B that the filter rod 13 is composed of a single segment, the present disclosure is not limited thereto. In other words, the filter rod 13 may be composed of a plurality of segments. For example, the filter rod 13 may include a first segment configured to cool an aerosol and a second segment configured to remove a predetermined component included in the aerosol. In addition, the filter rod 13 may further include at least one segment configured to perform other functions, as needed.

The stick 11 may be packed using at least one wrapper 15. The wrapper 15 may have at least one hole formed therein to allow external air to be introduced thereinto or to allow internal gas to be discharged therefrom. In one example, the stick 11 may be packed using one wrapper 15. In another example, the stick 11 may be doubly packed using two or more wrappers 15. For example, the tobacco rod 12 may be packed using a first wrapper. For example, the filter rod 13 may be packed using a second wrapper. The tobacco rod 12 and the filter rod 13, which are individually packed using separate wrappers, may be coupled to each other. The entire stick 11 may be packed using a third wrapper. When each of the tobacco rod 12 and the filter rod 13 is composed of a plurality of segments, each segment may be packed using a separate wrapper. The entire stick 11, formed by coupling segments, each of which is packed using a separate wrapper, to each other, may be packed using another wrapper.

The tobacco rod 12 may include an aerosol-generating substance. For example, the aerosol-generating substance may include at least one of glycerin, propylene glycol, ethylene glycol, dipropylene glycol, diethylene glycol, triethylene glycol, tetraethylene glycol, or oleyl alcohol, but the present disclosure is not limited thereto. Also, the tobacco rod 12 may include other additives, such as a flavoring agent, a wetting agent, and/or an organic acid. Also, a flavoring liquid, such as menthol or a moisturizer, may be injected into and added to the tobacco rod 12.

The tobacco rod 12 may be manufactured in various forms. For example, the tobacco rod 12 may be formed as a sheet or a strand. For example, the tobacco rod 12 may be formed as shredded tobacco, which is formed by cutting a tobacco sheet into tiny bits. For example, the tobacco rod 12 may be surrounded by a thermally conductive material. For example, the thermally conductive material may be a metal foil such as aluminum foil, but the present disclosure is not limited thereto. In one example, the thermally conductive material surrounding the tobacco rod 12 may uniformly distribute heat transmitted to the tobacco rod 12, thereby improving conduction of the heat applied to the tobacco rod. This may improve the taste of the tobacco. The thermally conductive material surrounding the tobacco rod 12 may function as a susceptor that is heated by the induction heater. Here, although not illustrated in the drawings, the tobacco rod 12 may further include an additional susceptor, in addition to the thermally conductive material surrounding the tobacco rod 12.

The filter rod 13 may be a cellulose acetate filter. The filter rod 13 may be formed in any of various shapes. For example, the filter rod 13 may be a cylinder-type rod. For example, the filter rod 13 may be a hollow tube-type rod. For example, the filter rod 13 may be a recess-type rod. When the filter rod 13 is composed of a plurality of segments, at least one of the plurality of segments may be formed in a different shape.

The filter rod 13 may be formed to generate flavors. In one example, a flavoring liquid may be injected into the filter rod 13. In one example, a separate fiber coated with a flavoring liquid may be inserted into the filter rod 13.

In addition, the filter rod 13 may include at least one capsule 14. Here, the capsule 14 may function to generate a flavor. The capsule 14 may function to generate an aerosol. For example, the capsule 14 may have a structure in which a liquid containing a flavoring material is wrapped with a film. The capsule 14 may have a spherical or cylindrical shape, but the present disclosure is not limited thereto.

When the filter rod 13 includes a segment configured to cool the aerosol, the cooling segment may be made of a polymer material or a biodegradable polymer material. For example, the cooling segment may be made of pure polylactic acid alone, but the present disclosure is not limited thereto. Alternatively, the cooling segment may be formed as a cellulose acetate filter having a plurality of holes formed therein. However, the cooling segment is not limited to the above-described example, and any other type of cooling segment may be used, so long as the same is capable of cooling the aerosol.

Although not illustrated in FIG. 2B, the stick 11 according to an embodiment may further include a front-end filter. The front-end filter may be located at the side of the tobacco rod 12 that faces the filter rod 13. The front-end filter may prevent the tobacco rod 12 from becoming detached outwards. The front-end filter may prevent a liquefied aerosol from flowing into the aerosol-generating device 100 from the tobacco rod 12 during inhalation by the user.

Figure 3:
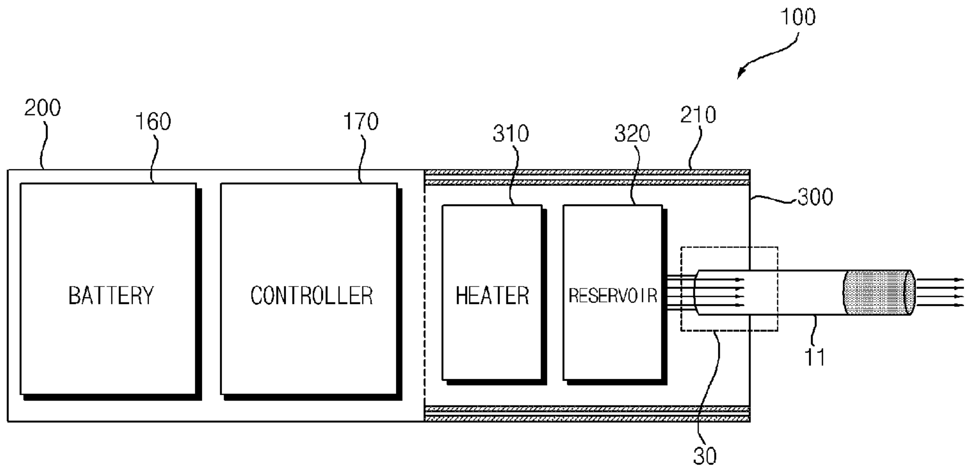

Referring to FIG. 3, the aerosol-generating device 100 according to an embodiment may include a main body 200 and a cartridge 300. The main body 200 may support the cartridge 300, and the cartridge 300 may contain an aerosol-generating substance.

According to one embodiment, the cartridge 300 may be configured so as to be detachably mounted to the main body 200. For example, the cartridge 300 may be mounted to the main body 200 in a manner such that at least a portion of the cartridge 300 is inserted into the space formed by a housing 315 of the main body 200.

The controller 170 may determine whether the cartridge 300 is in a mounted state or a detached state using a cartridge detection sensor included in the sensor module 150. For example, the cartridge detection sensor may transmit a pulse current through a first terminal in which the main body 200 and the cartridge 300 are in contact. In this case, the controller 170 may determine whether the cartridge 300 is in a connected state, based on whether the pulse current is received through a second terminal. In this case, the first terminal and the second terminal may be implemented by a pogo pin or the like.

The cartridge 300 may include a reservoir 320 configured to contain the aerosol-generating substance and/or a heater 310 configured to heat the aerosol-generating substance in the reservoir 320. For example, a liquid delivery element impregnated with (containing) the aerosol-generating substance may be disposed inside the reservoir 320. The electrically conductive track of the heater 310 may be formed in a structure that is wound around the liquid delivery element. In this case, when the liquid delivery element is heated by the heater 310, an aerosol may be generated. Here, the liquid delivery element may include a wick made of, for example, cotton fiber, ceramic fiber, glass fiber, or porous ceramic.

The cartridge 300 may include an insertion space 30 configured to allow the stick 11 to be inserted. For example, the cartridge 300 may include the insertion space 30 formed by an inner wall extending in a circumferential direction along a direction in which the stick 11 is inserted. In this case, the insertion space 30 may be formed by opening the insertion side of the inner wall up and down. The stick 330 may be inserted into the insertion space 30 formed by the inner wall.

The insertion space 30 into which the stick 11 is inserted may be formed in a shape corresponding to the shape of a portion of the stick 11 inserted into the insertion space 30. For example, when the stick 11 is formed in a cylindrical shape, the insertion space 30 may be formed in a cylindrical shape.

When the stick 11 is inserted into the insertion space, the outer surface of the stick 11 may be surrounded by the inner wall and contact the inner wall.

A portion of the stick 11 may be inserted into the insertion space 30 of the cartridge 300, and the remaining portion of the stick 11 may be exposed to the outside.

The user may inhale the aerosol while biting one end of the stick 11 with the mouth. The aerosol generated by the heater 310 may pass through the stick 11 and be delivered to the user's mouth. At this time, while the aerosol passes through the stick 11, the material contained in the stick 11 may be added to the aerosol. The material-infused aerosol may be inhaled into the user's oral cavity through one end of the stick 11.

Figure 4:
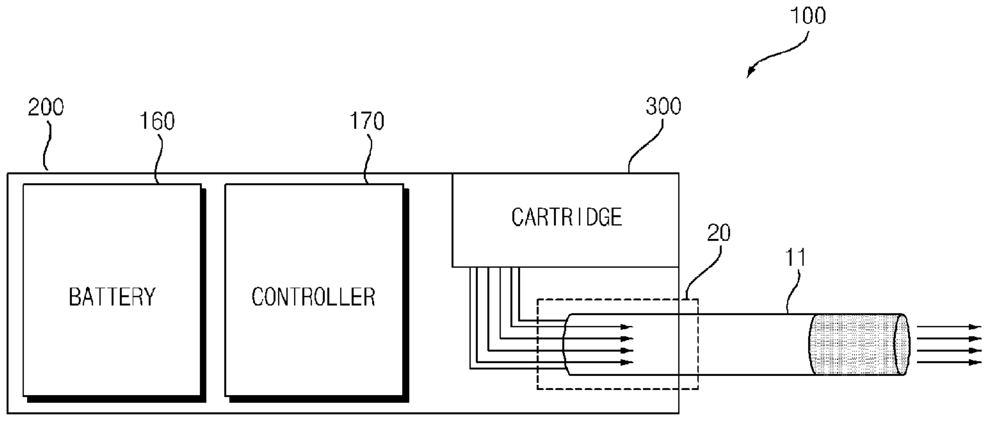

Referring to FIG. 4, the aerosol-generating device 100 according to an embodiment may include a main body 200 supporting the cartridge 300 and a cartridge 300 containing an aerosol-generating substance. The main body 200 may be formed so as to allow a stick 11 to be inserted into an insertion space 20 therein.

The aerosol-generating device 100 may include a first heater for heating the aerosol-generating substance stored in the cartridge 300. For example, when the user holds one end of the stick 11 in the mouth to inhale the aerosol, the aerosol generated by the first heater may pass through the stick 11. At this time, while the aerosol passes through the stick 11, a tobacco material may be added to the aerosol. The aerosol containing the tobacco material may be drawn into the user's oral cavity through one end of the stick 11.

Alternatively, according to another embodiment, the aerosol-generating device 100 may include a first heater for heating the aerosol-generating substance stored in the cartridge 300 and a second heater for heating the stick 11 inserted into the main body 200. For example, the aerosol-generating device 100 may generate an aerosol by heating the aerosol-generating substance stored in the cartridge 300 and the stick 11 using the first heater and the second heater, respectively.

Hereinafter, the directions of the aerosol-generating device 100 may be defined based on the orthogonal coordinate system shown in FIGS. 5A to 7C. In the orthogonal coordinate system, the x-axis direction may be defined as the leftward-rightward direction of the aerosol-generating device 100. Here, based on the origin, the +x-axis direction may be the rightward direction, and the −x-axis direction may be the leftward direction. The y-axis direction may be defined as the upward-downward direction of the aerosol-generating device 100. Here, based on the origin, the +y-axis direction may be the upward direction, and the −y-axis direction may be the downward direction. The z-axis direction may be defined as the forward-backward direction of the aerosol-generating device 100. Here, based on the origin, the +z-axis direction may be the forward direction, and the −z-axis direction may be the backward direction.

Figure 5A:
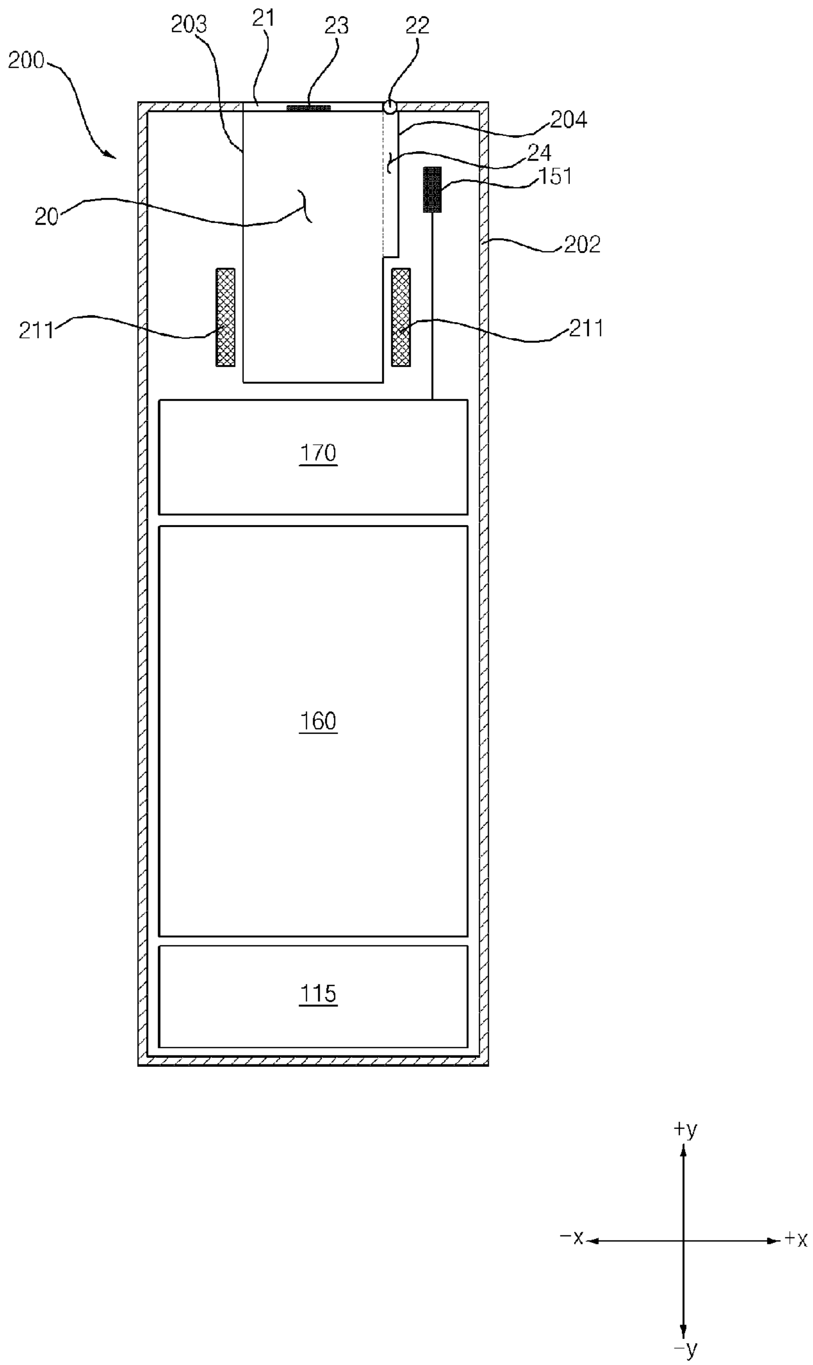
Figure 5B:
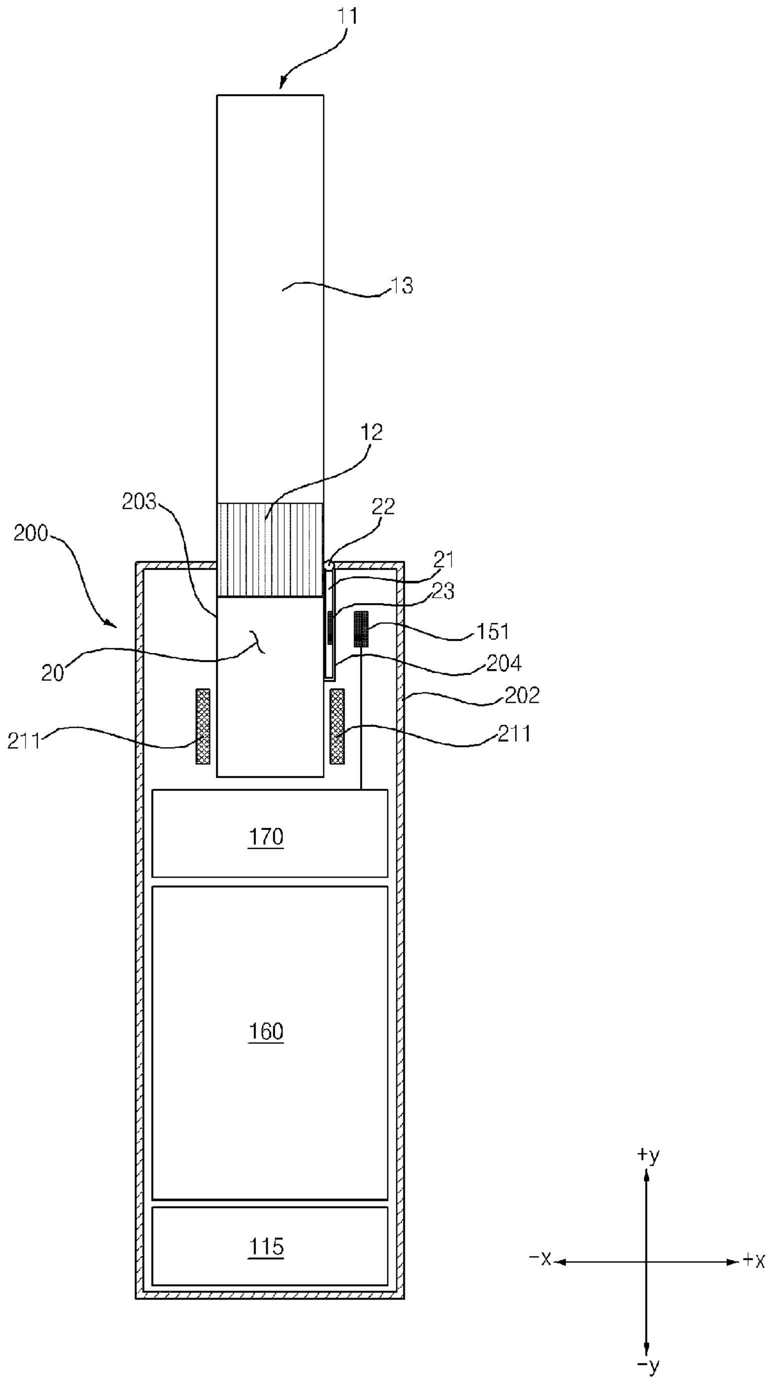
Figure 5C:
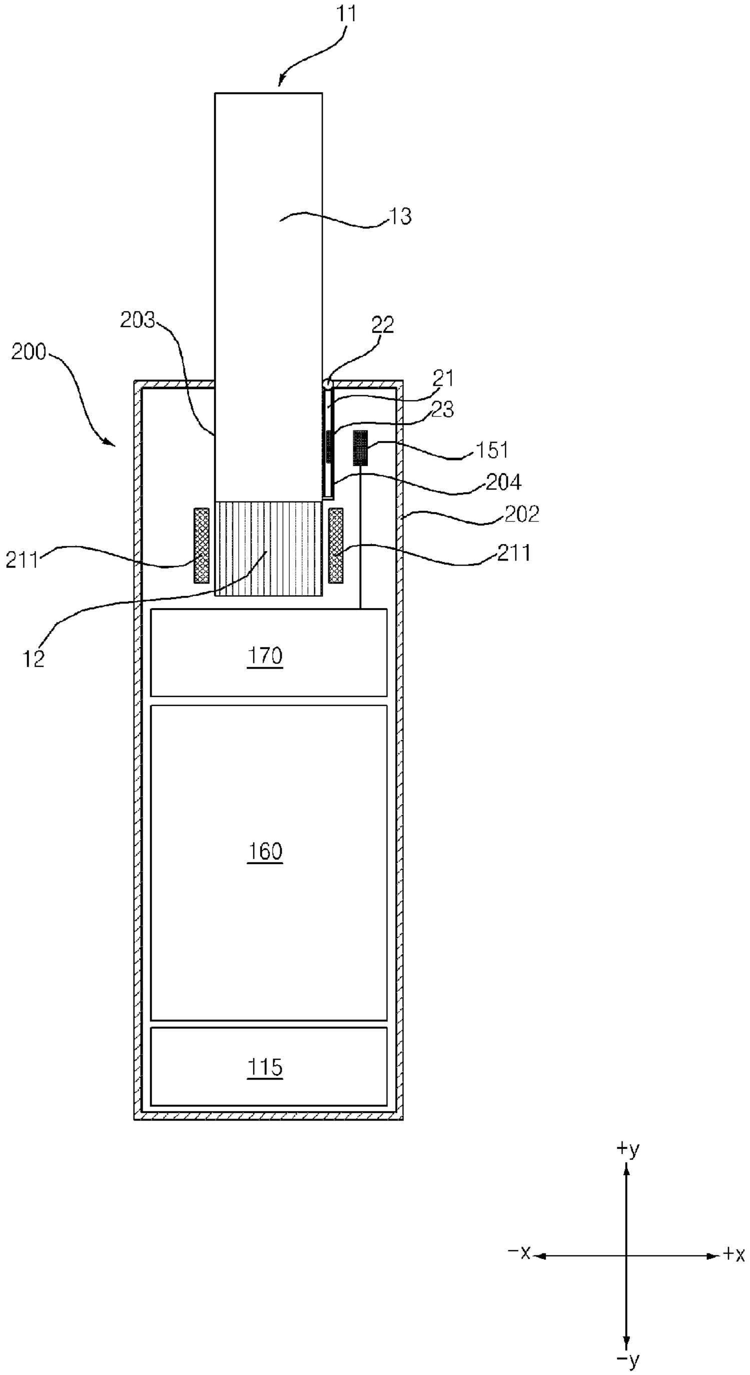

Referring to FIGS. 5A to 5C, according to at least one of the embodiments of the present disclosure, the main body 200 may have a shape that extends in the upward-downward direction. The main body 200 may have a hollow shape. The main body 200 may have the shape of a cylinder that extends in the upward-downward direction.

An outer wall 202 of the main body 200 may extend in the upward-downward direction. The outer wall 202 of the main body 200 may extend along the outer periphery of the main body 200. The outer wall 202 of the main body 200 may extend in the circumferential direction to form a cylindrical shape. The main body 200 may be elongated. The longitudinal direction of the main body 200 may refer to the direction in which the main body 200 is elongated. The longitudinal direction of the main body 200 may be the upward-downward direction.

An inner wall 203 of the main body 200 may extend in the upward-downward direction. The inner wall 203 of the main body 200 may extend along the inner periphery of the main body 200. The inner wall 203 of the main body 200 may extend in the circumferential direction to form a cylindrical shape.

The inner wall 203 of the main body 200 may form an insertion space 20 into which the stick 11 is inserted. The insertion space 20 in the main body 200 may be a space that is recessed to a predetermined depth into the aerosol generating device 100 for insertion of at least a portion of the stick 11 thereinto.

The main body 200 may be formed such that the upper side of the outer wall 202 and the upper side of the inner wall 203 are connected to each other.

The main body 200 may include a door 21 for opening and closing the insertion space 20 with respect to the outside. The door 21 may be disposed adjacent to a portion at which the upper side of the outer wall 202 and the upper side of the inner wall 203 of the main body 200 are connected to each other. The door 21 may have a shape corresponding to the cross-sectional shape of the insertion space 20 in the leftward-rightward direction.

The door 21 and the outer wall 202 of the main body 200 may form a continuous surface.

A hinge member 22 may be disposed at the portion at which the upper side of the outer wall 202 and the upper side of the inner wall 203 of the main body 200 are connected to each other.

The door 21 may be connected to the hinge member 22. The door 21 may be connected to the hinge member 22 so as to be pivotable into the insertion space 20. When the stick 11 is inserted into the insertion space 20, the door 21 may be pivoted in the downward direction, in which the stick 11 is inserted.

The hinge member 22 may include at least one elastic member, which provides elastic restoring force in a direction opposite the direction in which the door 21 is pivoted. For example, the hinge member 22 may include at least one spring. For example, when the elastic restoring force (or rotational restoring force) of the elastic member is applied to the door 21 in the state in which the door 21 is pivoted, the door 21 may return to the position at which a continuous surface is formed with the outer wall 202 of the main body 200 (hereinafter referred to as the "original position").

When the door 21 is pivoted into the insertion space 20, the insertion space 20 may be exposed to the outside. When the door 21 is located at the position at which the continuous surface is formed with the outer wall 202 of the main body 200, the insertion space 20 may be isolated from the outside.

The inner wall 203 of the main body 200 may have a recessed region 204, which is recessed in the main body 200. Specifically, the recessed region 204 of the inner wall 203 may be recessed in the radially outward direction of the main body 200. The depth of the recessed region 204 of the inner wall 203 may correspond to the height of the door 21 in the upward-downward direction. The cross-sectional shape of the recessed region 204 of the inner wall 203 may correspond to the cross-sectional shape of the door 21 in the leftward-rightward direction.

When the door 21 is pivoted into the insertion space 20, the door 21 may be located in an inner space 24 defined by the recessed region 204 of the inner wall 203. The lower surface of the pivoted door 21 may be in contact with the recessed region 204 of the inner wall 203. The upper surface of the pivoted door 21 may form a continuous surface with the remaining region of the inner wall 203 other than the recessed region 204.

When the stick 11 is inserted into the insertion space 20, the outer peripheral surface of the stick 11 may be surrounded by the inner wall 203 and the upper surface of the pivoted door 21.

The door 21 may include a magnetic body 23 having a magnetic property. The magnetic body 23 may be implemented as a magnet. For example, the magnetic body 23 may be disposed inside the door 21.

A magnetic sensor 151 may be disposed between the outer wall 202 and the inner wall 203 of the main body 200. The magnetic sensor 151 may be disposed adjacent to the inner space 24 defined by the recessed region 204 of the inner wall 203. The magnetic sensor 151 may be disposed at a position corresponding to the position at which the magnetic body 23 included in the door 21 is located when the door 21 is located in the inner space 24.

The magnetic sensor 151 may sense magnetization of the magnetic body 23, the direction or intensity of a magnetic field, or a change in the magnetic field, and may output a signal indicating the sensed value. The magnetic sensor 151 may be, for example, a Hall sensor, a rotating coil, a magnetoresistor, or a superconducting quantum interference device (SQUID), but the present disclosure is not limited thereto.

A heater 211 may be disposed adjacent to the insertion space 20, and may heat the stick 11 inserted into the insertion space 20. The heater 211 may be disposed at a position corresponding to the position at which the tobacco rod 12 of the stick 11 is located when the stick 11 is inserted into the insertion space 20.

Although the heater 211 is illustrated in the drawings as being an induction heater, which generates an alternating magnetic field, which periodically changes in direction, by adjusting the current flowing through an electrically conductive coil, the present disclosure is not limited thereto.

A terminal 115, a battery 160, and/or a controller 170 may be disposed in the interior of the main body 200, which is surrounded by the outer wall 202 and the inner wall 203 of the main body 200.

The terminal 115 may be disposed in the bottom portion of the main body 200. The terminal 115 may be electrically connected to an external power source to receive power therefrom, and may transmit the power to the battery 160. The terminal 115 may be disposed below the battery 160.

The controller 170 may determine the position of the door 21 based on the signal output from the magnetic sensor 151. For example, the controller 170 may determine whether the door 21 is located in the inner space 24 based on the signal output from the magnetic sensor 151.

Upon determining that the door 21 is located in the inner space 24, the controller 170 may determine that at least a portion of the stick 11 has been inserted into the insertion space 20. That is, the magnetic sensor 151 may serve as a stick detection sensor.

Figure 6A:
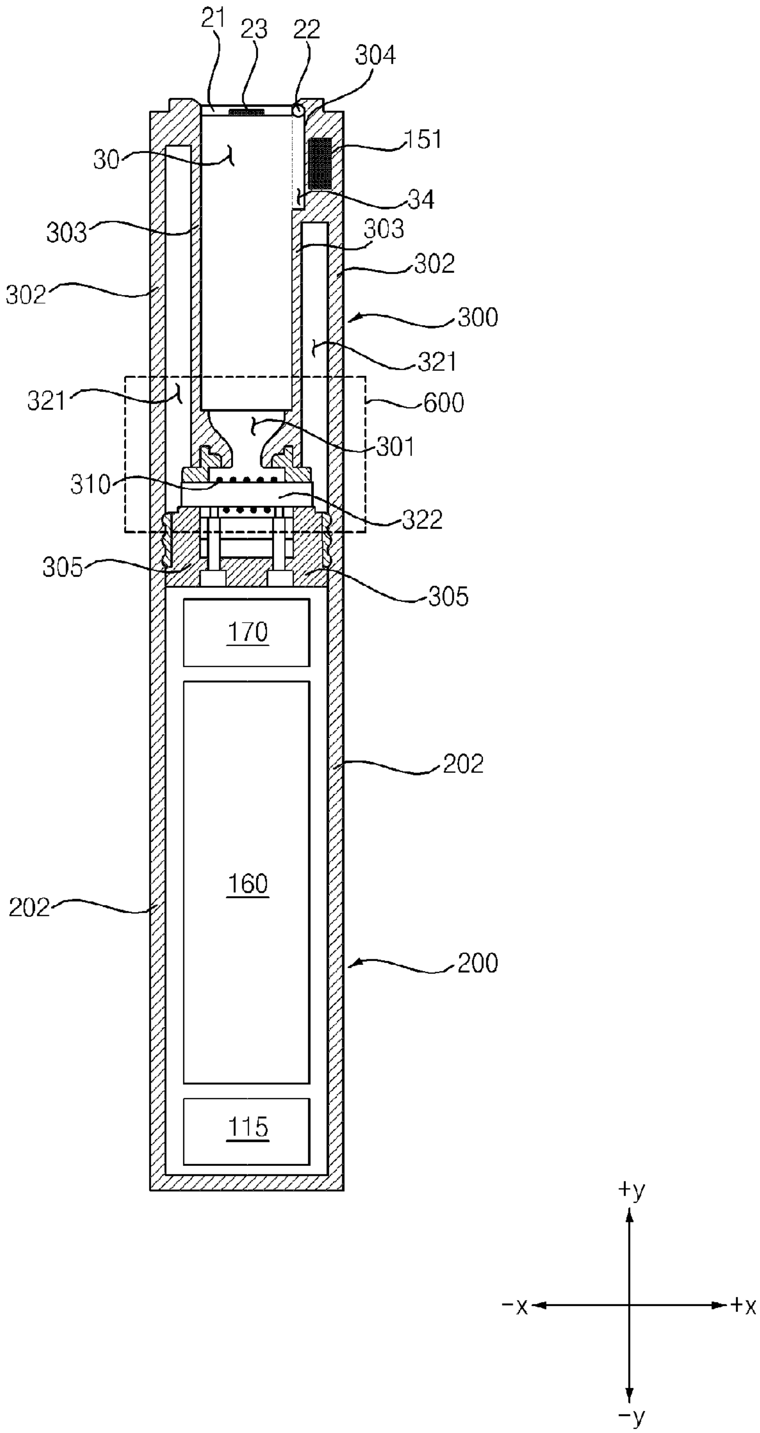
Figure 6B:
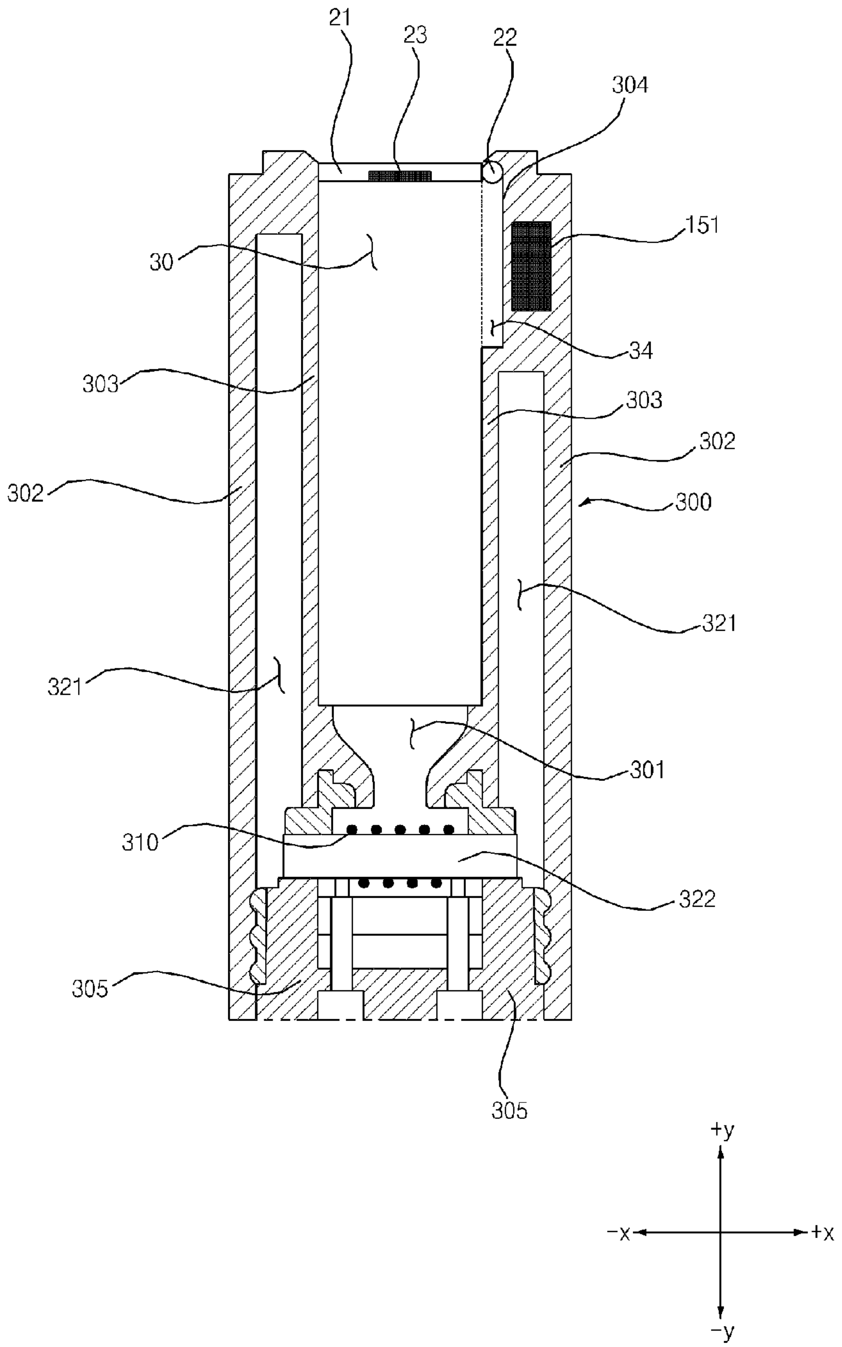
Figure 6C:
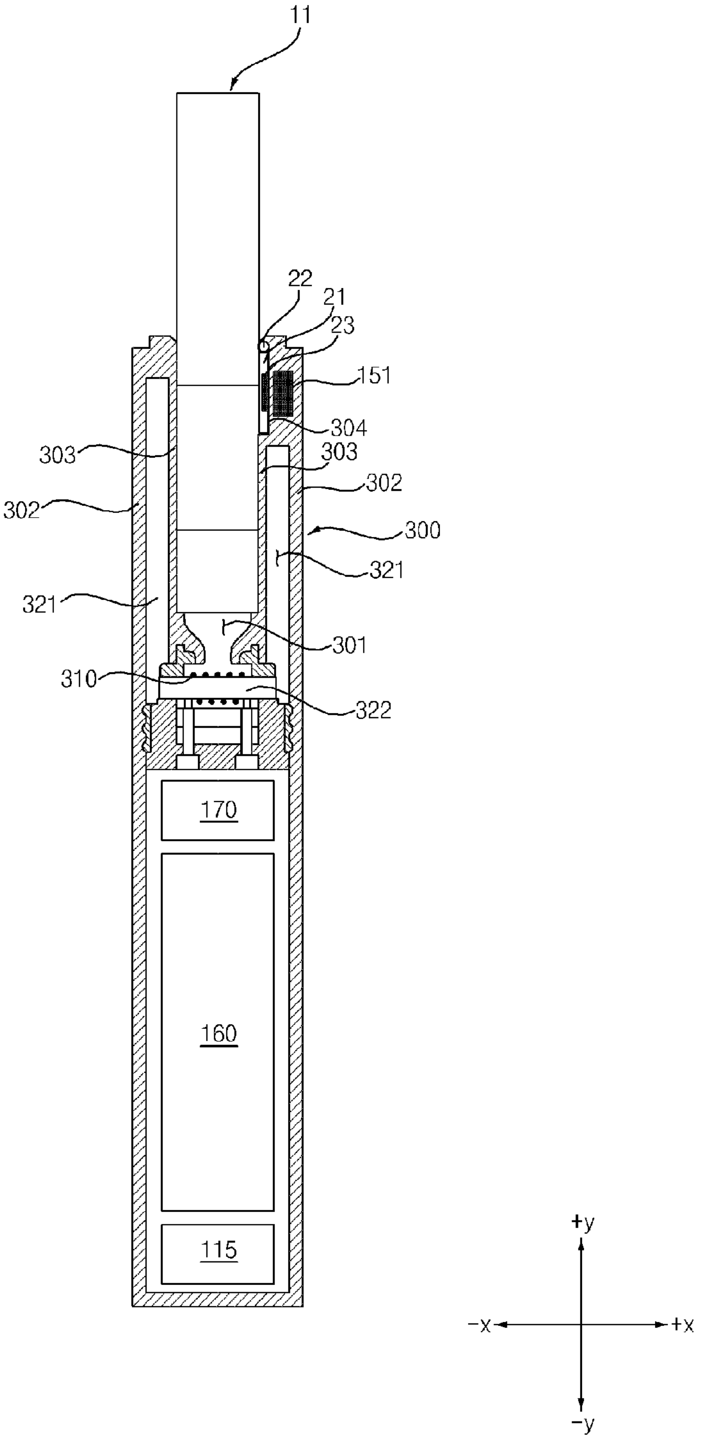

Referring to FIGS. 6A to 6C, according to at least one of the embodiments of the present disclosure, the cartridge 300 may have a shape that extends in the upward-downward direction. The cartridge 300 may have a hollow shape. The cartridge 300 may have the shape of a cylinder that extends in the upward-downward direction.

The cartridge 300 may include an outer wall 302 and an inner wall 303. The outer wall 302 may extend in the upward-downward direction. The outer wall 302 may extend along the outer periphery of the cartridge 300. The outer wall 302 may extend in the circumferential direction to form a cylindrical shape. The cartridge 300 may be elongated. The longitudinal direction of the cartridge 300 may refer to the direction in which the cartridge 300 is elongated. The longitudinal direction of the cartridge 300 may be the upward-downward direction.

The inner wall 303 may extend in the upward-downward direction. The inner wall 303 may extend along the inner periphery of the cartridge 300. The inner wall 303 may extend in the circumferential direction to form a cylindrical shape.

The inner wall 303 may be spaced inwards apart from the outer wall 302. The inner wall 303 may be spaced apart from the outer wall 302 in the radially inward direction. The upper side of the outer wall 302 and the upper side of the inner wall 303 may be connected to each other.

The inner wall 303 may extend both in the upward-downward direction and in the circumferential direction to form an insertion space 30 therein. The insertion space 30 may be formed such that the interior of the inner wall 303 is open in the upward-downward direction. The inner wall 303 may be disposed between a chamber 321 and the insertion space 30. The inner wall 303 may define the insertion space 30.

The insertion space 30 may have a shape corresponding to the shape of the portion of the stick 11 that is inserted thereinto. The insertion space 30 may be elongated in the upward-downward direction. The insertion space 30 may have a cylindrical shape. When the stick 11 is inserted into the insertion space 30, the stick 11 may be surrounded by the inner wall 303, and may be in close contact with the inner wall 303.

The chamber 321 may be defined by the outer wall 302, the inner wall 303, and the lower portion 305 of the cartridge 300.

The chamber 321 may be formed between the outer wall 302 and the inner wall 303. The chamber 321 may extend in the upward-downward direction. The chamber 321 may extend in the circumferential direction along the outer wall 302 and the inner wall 303. The chamber 321 may have a cylindrical shape. A pre-vaporized aerosol material may be stored in the chamber 321. The pre-vaporized aerosol material may be liquid.

A flow path 301 may be formed in the lower portion of the inner wall 303. The suctioned air may pass through the flow path 301.

The flow path 301 may be formed between the insertion space 30 and a wick 322. The aerosol generated from the wick 322 may flow toward the insertion space 30 through the flow path 301. The flow path 301 may have a shape that narrows at the middle and widens at the end in the direction in which the aerosol flows. The direction in which the aerosol flows may be the upward direction.

The wick 322 may be connected to the interior of the chamber 321. The wick 322 may absorb the pre-vaporized aerosol material stored in the chamber 321. The wick 322 may be adjacent to one end of the insertion space 30 in the longitudinal direction of the cartridge 300.

The wick 322 may be disposed below the insertion space 30. The wick 322 may be disposed below the flow path 301. The wick 322 may be connected to the chamber 321 to absorb the pre-vaporized aerosol material stored in the chamber 321. The wick 322 may be inserted into the space between the inner wall 303 and the lower portion 305 of the cartridge 300. The wick 322 may extend in one direction. The wick 322 may be elongated in the leftward-rightward direction.

The heater 310 may be disposed around the wick 322. The heater 310 may be wound around the wick 322 in the direction in which the wick 322 extends. The heater 310 may apply heat to the wick 322. The heater 310 may generate an aerosol from the pre-vaporized aerosol material absorbed in the wick 322 using an electrical resistance heating method. The heater 310 may be connected to the controller 170, and the supply of power to the heater 310 may be controlled by the controller 170.

The stick 11 may be elongated in the upward-downward direction. The stick 11 may be inserted into the cartridge 300. The stick 11 may be inserted into the space defined by the inner wall 303 of the cartridge 300. The aerosol generated from the wick 322 may be transferred to the stick 11 through the flow path 301.

Accordingly, the chamber 321 of the cartridge 300, in which the pre-vaporized aerosol material is stored, may be disposed so as to surround the stick 11, thus making it possible to efficiently increase the amount of space for storing the pre-vaporized aerosol material in a liquid state.

Accordingly, the distance from the heater 310, which generates an aerosol by heating the wick 322, which is connected to the chamber 321 storing the pre-vaporized aerosol material, and the pre-vaporized aerosol material, to the stick 11 may be short, thus making it possible to increase efficiency of transfer of the high-temperature aerosol to the stick 11 without substantial heat loss.

The cartridge 300 may include a door 21 for opening and closing the insertion space 30 with respect to the outside. The door 21 may be disposed adjacent to a portion at which the upper side of the outer wall 302 and the upper side of the inner wall 303 of the cartridge 300 are connected to each other. The door 21 may have a shape corresponding to the cross-sectional shape of the insertion space 30 in the leftward-rightward direction.

A hinge member 22, which is connected to the door 21, may be disposed at the upper side of the outer wall 302 of the cartridge 300.

When the elastic restoring force (or rotational restoring force) of the elastic member is applied to the door 21 in the state in which the door 21 is pivoted into the insertion space 30, the door 21 may return to the original position thereof, at which a continuous surface is formed with the outer wall 302 of the cartridge 300.

When the door 21 is pivoted into the insertion space 30, the insertion space 30 may be exposed to the outside. When the door 21 is located at the position at which the continuous surface is formed with the outer wall 302 of the cartridge 300, the insertion space 30 may be isolated from the outside.

The inner wall 303 of the cartridge 300 may have a recessed region 304, which is recessed in the cartridge 300. The depth of the recessed region 304 of the inner wall 303 may correspond to the height of the door 21 in the upward-downward direction. The cross-sectional shape of the recessed region 304 of the inner wall 303 may correspond to the cross-sectional shape of the door 21 in the leftward-rightward direction.

When the door 21 is pivoted into the insertion space 30, the door 21 may be located in an inner space 34 defined by the recessed region 304 of the inner wall 303. The lower surface of the pivoted door 21 may be in contact with the recessed region 304 of the inner wall 303. The upper surface of the pivoted door 21 may form a continuous surface with the remaining region of the inner wall 303 other than the recessed region 304.

When the stick 11 is inserted into the insertion space 30, the outer peripheral surface of the stick 11 may be surrounded by the inner wall 303 and the upper surface of the pivoted door 21.

A magnetic sensor 151 may be disposed between the outer wall 302 and the inner wall 303 of the cartridge 300.

The magnetic sensor 151 may be disposed adjacent to the inner space 34 defined by the recessed region 304 of the inner wall 303. The magnetic sensor 151 may be disposed at a position corresponding to the position at which the magnetic body 23 included in the door 21 is located when the door 21 is located in the inner space 34.

The length in the upward-downward direction of the portion of the chamber 321 that is disposed below the magnetic sensor 151 may be shorter than the length of the remaining portion of the chamber 321 in the upward-downward direction.

The cartridge 300 and the main body 200 may be connected to each other. The cartridge 300 may be disposed on the main body 200. The cartridge 300 may be detachably coupled to the main body 200. The outer wall 302 of the cartridge 300 and the outer wall 202 of the main body 200 may form a continuous surface.

The controller 170 may be disposed inside the main body 200. The controller 170 may control the on/off operation of the device. The controller 170 may be electrically connected to the heater 310 to control the supply of power to the heater 310 so that the heater 310 heats the wick. The controller 170 may be disposed below the heater 310. The controller 170 may be disposed adjacent to the heater 310.

Figure 6D:
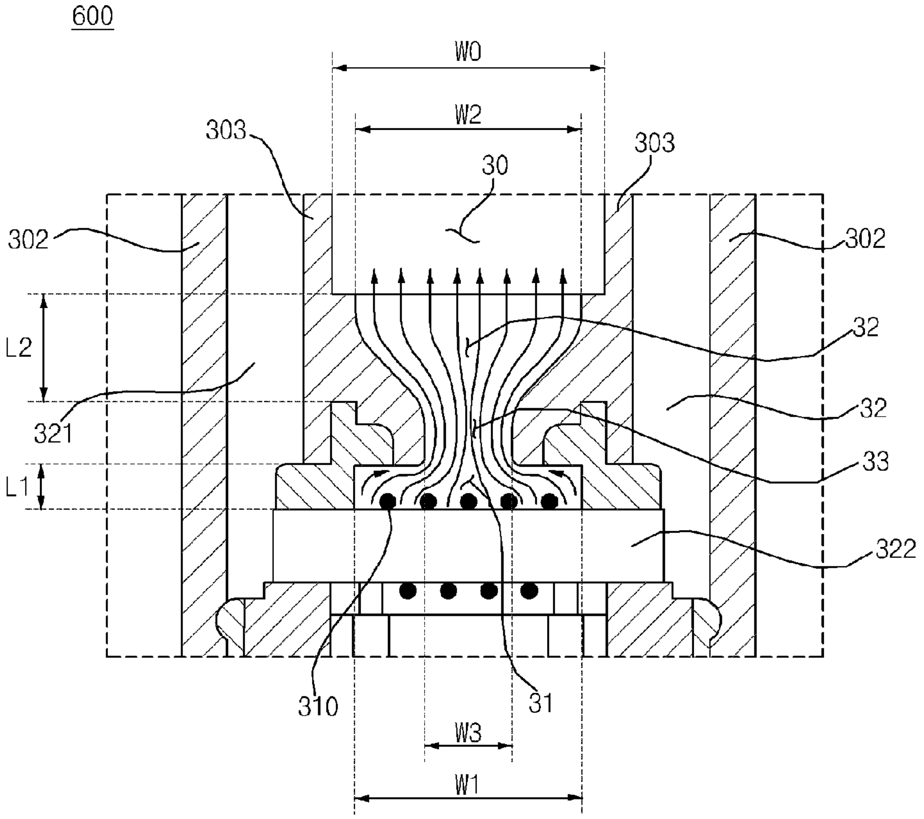

Referring to FIG. 6D, the flow path 301 may be divided into a first flow path 31, a second flow path 32, and a third flow path 33.

The first flow path 31 may be located adjacent to the wick 322. The first flow path 31 may be disposed above the wick 322. The second flow path 32 may be located adjacent to the insertion space 30. The second flow path 32 may communicate with the insertion space 30.

The third flow path 33 may be located between the first flow path 31 and the second flow path 32. The third flow path 33 may be located above the first flow path 31. The second flow path 32 may be located above the third flow path 33. The third flow path 33 may cause the first flow path 31 and the second flow path 32 to communicate with each other.

The width W3 of the third flow path 33 may be smaller than the width W1 of the first flow path 31. The width W3 of the third flow path 33 may be smaller than the width W2 of the second flow path 32. The maximum width W1 of the first flow path 31 and the maximum width W2 of the second flow path 32 may be substantially equal to or similar to each other. The maximum width W1 of the first flow path 31 may be greater than the maximum width W2 of the second flow path 32. The width W2 of the second flow path 32 may be smaller than the width W0 of the insertion space 30.

The width of the flow path 301 may gradually decrease from the first flow path 31 to the third flow path 33. The width of the flow path 301 may gradually increase from the third flow path 33 to the second flow path 32. The width W2 of the second flow path 32 may gradually increase in a direction approaching the insertion space 30.

The aerosol, which flows through the first flow path 31, is concentrated in the third flow path 33, which has a relatively small width, and is then diffused through the second flow path 32. Accordingly, even if the aerosol is not uniformly generated from the wick 322, the aerosol may be uniformly introduced into the lower portion of the stick 11.

The width W1 of the first flow path 31 may gradually decrease in a direction approaching the third flow path 33. The width W2 of the second flow path 32 may gradually decrease in a direction approaching the third flow path 33.

The degree to which the width W1 of the first flow path 31 decreases in a direction approaching the third flow path 33 may be greater than the degree to which the width W2 of the second flow path 32 decreases in a direction approaching the third flow path 33. The distance L1 by which the width of the flow path 301 changes from the maximum width W1 of the first flow path 31 to the width W3 of the third flow path 33 may be shorter than the distance L2 by which the width of the flow path 301 changes from the maximum width W2 of the second flow path 32 to the width W3 of the third flow path 33. That is, the ratio of the width change to the length ((W1−W3)/L1) from the first flow path 31 to the third flow path 33 may be greater than the ratio of the width change to the length ((W2−W3)/L2) from the second flow path 32 to the third flow path 33.

In other words, the first to third flow paths 31 to 33 may have the following relationship.

$$(W1-W3)/L1>(W2-W3)/L2$$

Here, "W1" represents the width of the first flow path 31 in the leftward-rightward direction, "W2" represents the width of the second flow path 32 in the leftward-rightward direction, "W3" represents the width of the third flow path 33 in the leftward-rightward direction, "L1" represents the length of the first flow path 31 in the upward-downward direction, and "L2" represents the length of the second flow path 32 in the upward-downward direction.

The length L1 of the first flow path 31 in the upward-downward direction may be shorter than the length L2 of the second flow path 32 in the upward-downward direction (L1<L2).

Accordingly, it is possible to secure space for inducing the pre-vaporized aerosol material to be atomized and concentrated in the third flow path 33 while reducing the length of the first flow path 31 and to cause the aerosol concentrated in the third flow path 33 to be uniformly diffused and introduced into the insertion space 30 through the second flow path 32.

Figure 7A:
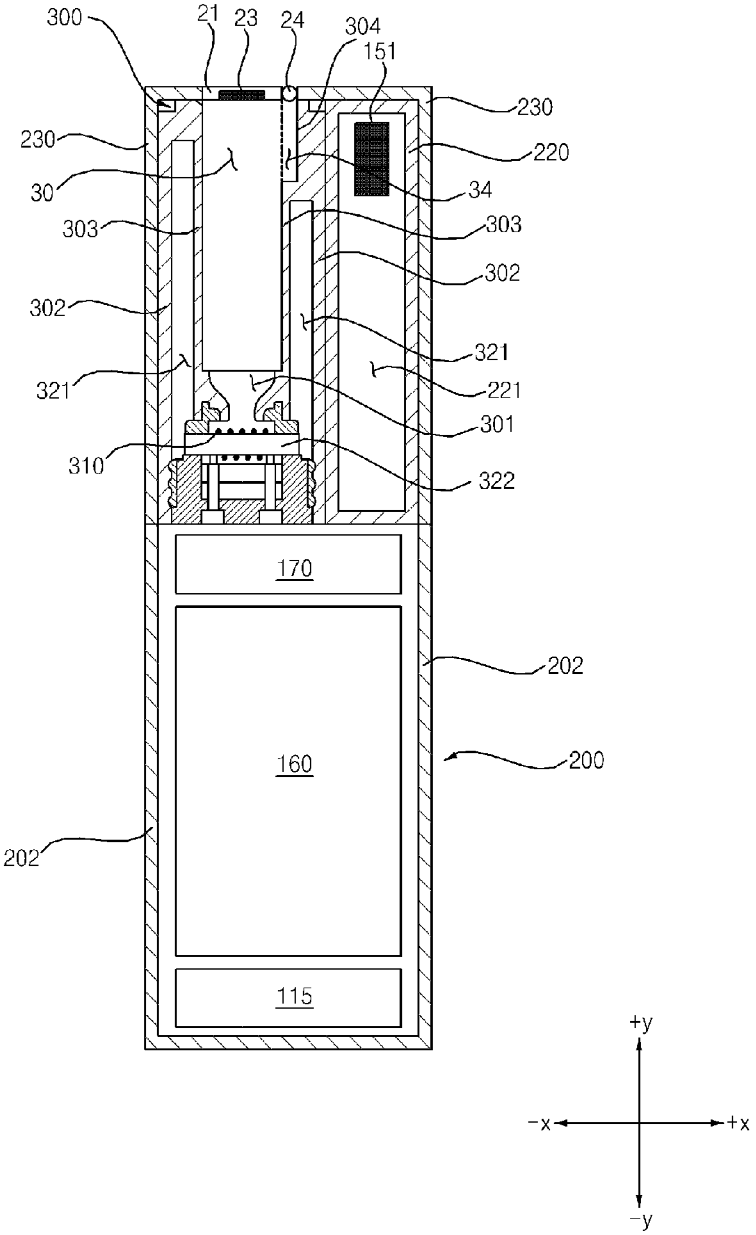
Figure 7B:
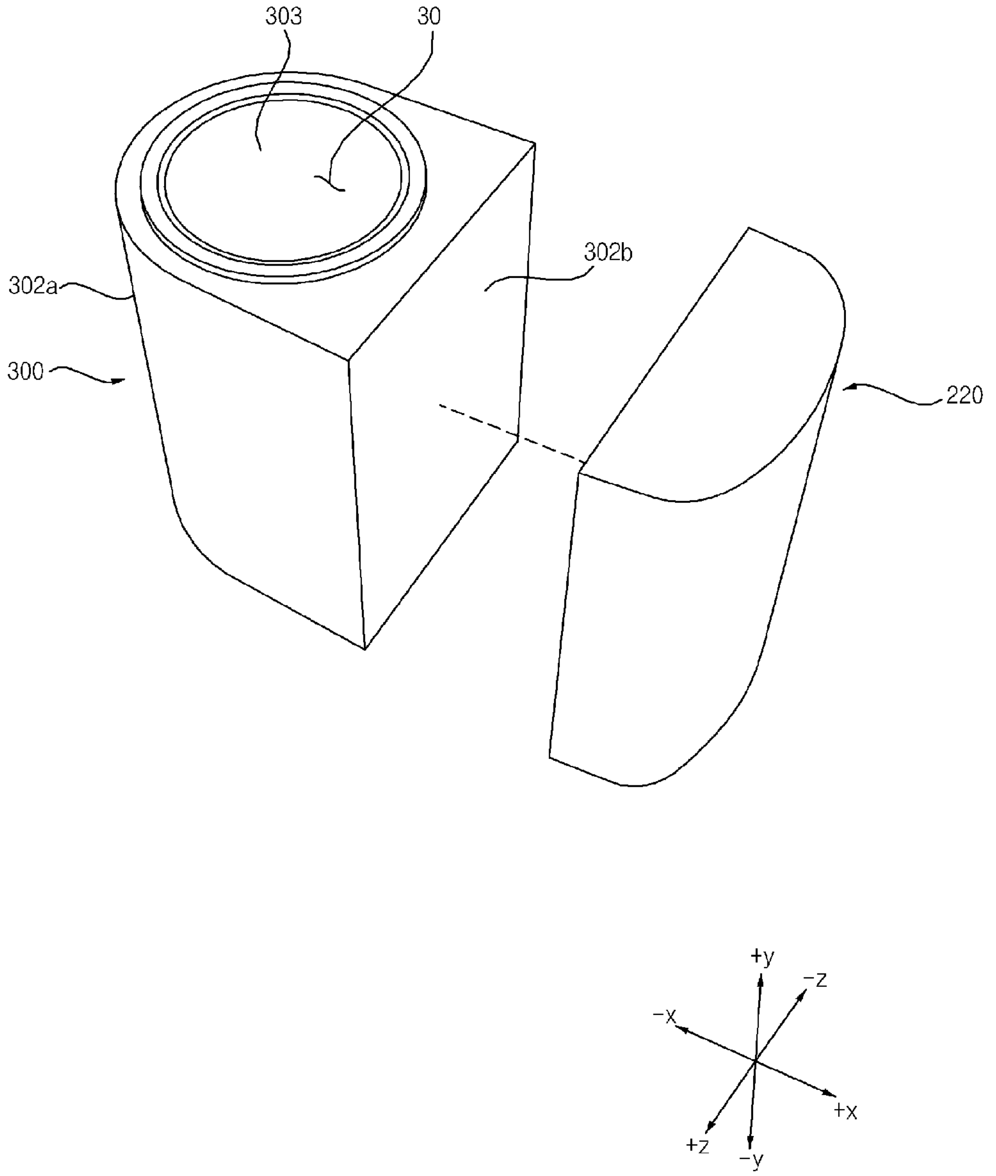
Figure 7C:
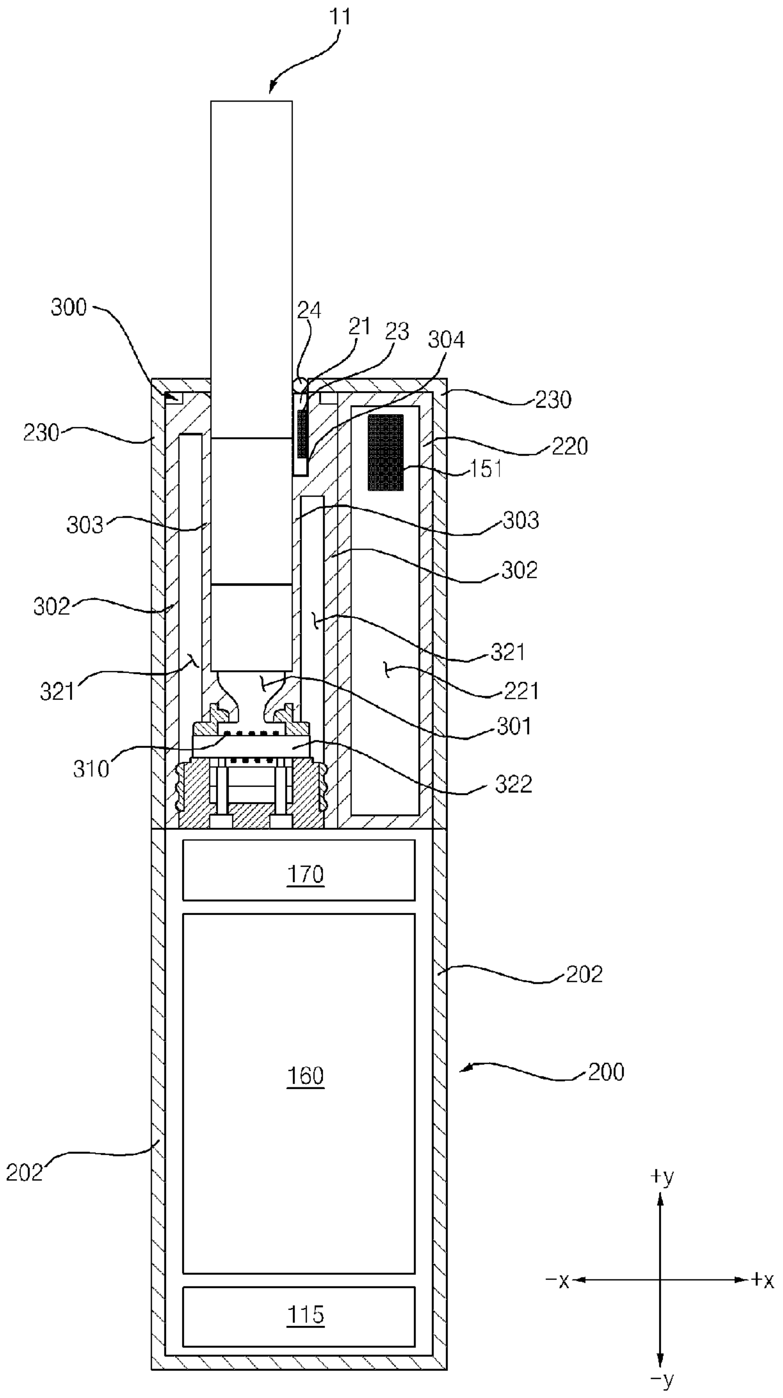

Referring to FIGS. 7A to 7C, an upper housing 220 may be disposed adjacent to the cartridge 300. The upper housing 220 may be disposed adjacent to one side surface **302*b* of the outer wall 302 of the cartridge 300. In this case, the side surface 302*b* of the outer wall 302 may be the portion of the outer wall 302 of the cartridge 300 that is adjacent to the inner space 34, in which the pivoted door 21** is located.

An opposite side surface **302*a* of the outer wall 302 may be formed on the left side of the outer wall 302. The opposite side surface 302*a* of the outer wall 302 may be located opposite the side surface 302*b* of the outer wall 302**.

The side surface **302*b* and the opposite side surface 302*a* of the outer wall 302 may have different shapes from each other. The opposite side surface 302*a* of the outer wall 302 may be formed in a shape that is rounded so as to be convex outwards. The side surface 302*b* of the outer wall 302 may not be formed in a rounded shape. The side surface 302*b* of the outer wall 302 may include a flat portion. The side surface 302*b* of the outer wall 302** may include a portion that extends flat in the upward-downward direction and/or the forward-backward direction.

The upper housing 220 may be coupled to or formed integrally with the main body 200. The upper housing 220 may be disposed on the main body 200. The upper housing 220 and the cartridge 300 may be arranged parallel to each other on the main body 200.

The cartridge 300 may be detachably coupled to the upper surface of the main body 200 and to one surface of the upper housing 220.

The upper housing 220 may have formed therein an accommodation space 221. A magnetic sensor 151 may be disposed in the accommodation space 221 in the upper housing 220.

The magnetic sensor 151 may be disposed outside the outer wall 302 of the cartridge 300. The magnetic sensor 151 may be disposed so as to face the outer wall 302 of the cartridge 300.

A cover 230 may be disposed on the main body 200. The cover 230 may be disposed outside the cartridge 300 and the upper housing 220 so as to surround the cartridge 300 and the upper housing 220. The outer surface of the cover 230 may be located parallel to the outer wall 202 of the main body 200. The outer surface of the cover 230 may form a continuous surface with the outer wall 202 of the main body 200. The outer surface of the cover 230 may be located in an imaginary plane extending from the outer wall 202 of the main body 200.

The cover 230 may be detachably coupled to the upper side of the main body 200. The cartridge 300 may be separated from the main body 200 in the state in which the cover 230 is removed from the main body 200.

A receiving passage may be formed in a portion of the upper surface of the cover 230. The receiving passage may be formed so as to have a shape corresponding to the shape of the insertion space 30 in the cartridge 300, and may cause the insertion space 30 to communicate with the outside. The stick 11 may be inserted into the insertion space 30 through the receiving passage formed in the upper surface of the cover 230.

A door 21 for opening and closing the insertion space 30 with respect to the outside may be disposed adjacent to the receiving passage formed in the upper surface of the cover 230. The door 21 may have a shape corresponding to the cross-sectional shape of the receiving passage in the leftward-rightward direction.

A hinge member 22, which is connected to the door 21, may be disposed in the upper surface of the cover 230. For example, the hinge member 22 may be disposed on the inner peripheral surface of the receiving passage.

When the elastic restoring force (or rotational restoring force) of the elastic member is applied to the door 21 in the state in which the door 21 is pivoted into the insertion space 30, the door 21 may return to the original position thereof, at which a continuous surface is formed with the upper surface of the cover 230.

When the door 21 is pivoted into the insertion space 30, the insertion space 30 may be exposed to the outside. When the door 21 is located at the position at which the continuous surface is formed with the upper surface of the cover 230, the insertion space 30 may be isolated from the outside.

When the door 21 is pivoted into the insertion space 30, the door 21 may be located in an inner space 34 defined by a recessed region 304 formed in the inner wall 303 of the cartridge 300. The lower surface of the pivoted door 21 may be in contact with the recessed region 304 of the inner wall 303. The upper surface of the pivoted door 21 may form a continuous surface with the remaining region of the inner wall 303 other than the recessed region 304.

When the stick 11 is inserted into the insertion space 30, the outer peripheral surface of the stick 11 may be surrounded by the inner wall 303, the upper surface of the pivoted door 21, and the inner peripheral surface of the receiving passage.

Figure 8:
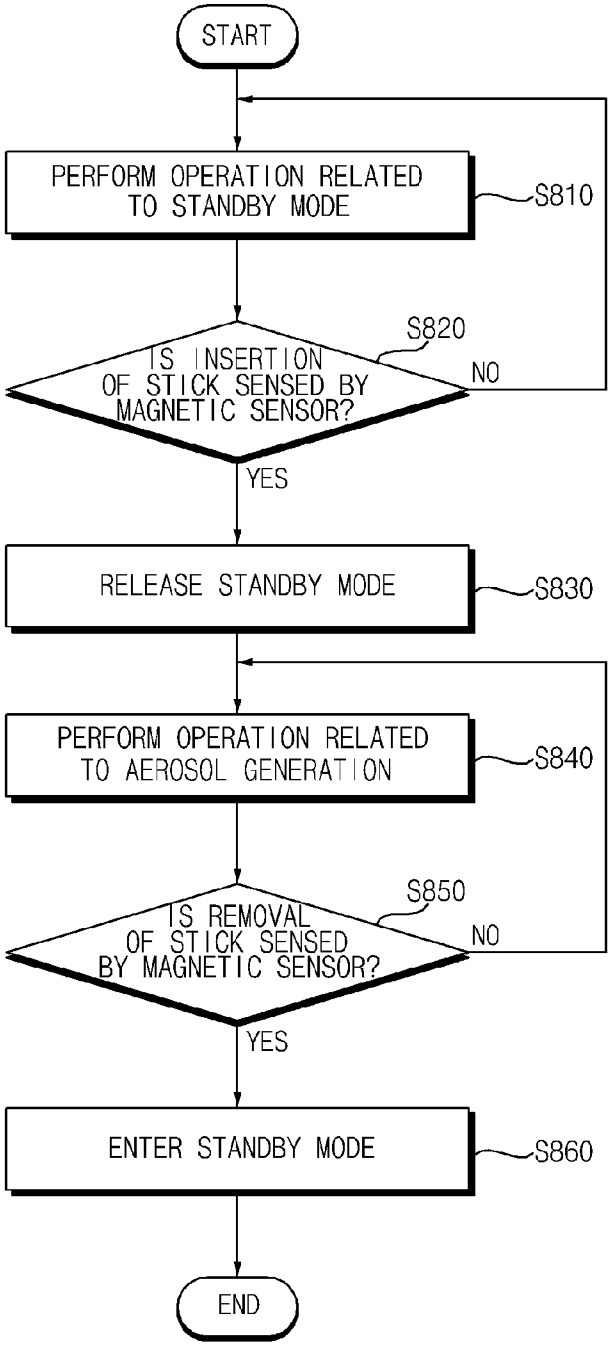
FIG. 8 is a flowchart showing an operation method of the aerosol-generating device according to an embodiment of the present disclosure.

FIG. 8 is a flowchart of an operation method of the aerosol-generating device according to another embodiment of the present disclosure.

Referring to FIG. 8, the aerosol-generating device 100 may perform an operation related to a standby mode in operation S810. Here, the standby mode may be a mode for minimizing consumption of the power stored in the battery 160 of the aerosol-generating device 100. For example, in the standby mode, the aerosol-generating device 100 may interrupt the supply of power to at least one component (e.g. the heater 210 or 310).

The aerosol-generating device 100 may determine whether insertion of the stick 11 into the insertion space 20 or 30 is sensed by the magnetic sensor 151 in operation S820. For example, the aerosol-generating device 100 may determine whether the door 21 is pivoted and located in the inner space 24 or 34 using the magnetic sensor 151.

In the case in which the stick 11 is inserted into the insertion space 30 formed in the cartridge 300, when it is determined using the cartridge detection sensor that the cartridge 300 has not been mounted to the main body 200, the aerosol-generating device 100 may continue to perform the operation related to the standby mode. In this case, the aerosol-generating device 100 may interrupt the supply of power to the magnetic sensor 151 until it is determined using the cartridge detection sensor that the cartridge 300 has been mounted to the main body 200.

When insertion of the stick 11 into the insertion space 20 or 30 is sensed by the magnetic sensor 151, the aerosol-generating device 100 may release the standby mode in operation S830. For example, when it is determined using the magnetic sensor 151 that the door 21 is pivoted and located in the inner space 24 or 34, the aerosol-generating device 100 may determine that the stick 11 has been inserted into the insertion space 20 or 30.

The aerosol-generating device 100 may perform an operation related to aerosol generation in operation S840. For example, the aerosol-generating device 100 may control components so that power for preheating the heater 210 or 310 is supplied from the battery 160 to the heater 210 or 310. For example, the aerosol-generating device 100 may adjust the intensity of power that is supplied from the battery 160 to the heater 210 or 310 based on the temperature profile stored in the memory 140. For example, the aerosol-generating device 100 may adjust the intensity of power that is supplied from the battery 160 to the heater 210 or 310 depending on whether a puff is sensed through the puff sensor included in the sensor module 150.

The aerosol-generating device 100 may determine whether the stick 11 is removed from the insertion space 20 or 30 using the magnetic sensor 151 in operation S850. For example, the aerosol-generating device 100 may determine whether the door 21 returns to the original position thereof due to the elastic restoring force applied thereto in a direction opposite the pivoting direction using the magnetic sensor 151.

The aerosol-generating device 100 may enter the standby mode when it is determined that the stick 11 has been removed from the insertion space 20 or 30 in operation S860.

As described above, according to at least one of the embodiments of the present disclosure, it is possible to rapidly determine whether the stick 11 is inserted into the insertion space 20 or 30 before the stick 11 is completely inserted based on a magnetic field sensed by the magnetic sensor 151.

According to at least one of the embodiments of the present disclosure, it is possible to automatically release the standby mode at the time of insertion of the stick 11 and to automatically enter the standby mode at the time of removal of the stick 11 based on the magnetic field sensed by the magnetic sensor 151, thus reducing unnecessary consumption of power and improving user convenience.

Referring to FIGS. 1 to 8, an aerosol-generating device 100 in accordance with one aspect of the present disclosure may include a door 21 configured to open and close an insertion space 20 or 30 into which a stick 11 is inserted, a hinge member 22 connected to the door 21 to allow the door 21 to be pivoted in the direction in which the stick 11 is inserted, a magnetic body 23 disposed at the door 21, a magnetic sensor 151 configured to sense a magnetic field, and a controller 170 configured to determine whether the stick 11 is inserted into the insertion space 20 or 30 using the magnetic sensor 151.

In addition, in accordance with another aspect of the present disclosure, the hinge member 22 may include an elastic member configured to provide elastic restoring force in a direction opposite the direction in which the door 21 is pivoted.

In addition, in accordance with another aspect of the present disclosure, the aerosol-generating device may further include a main body 200 formed to be long and including an inner wall 203 having formed therein the insertion space 20. The main body 200 may further include an inner space 24 formed by a region 204 of the inner wall 203 that is recessed in the main body 200.

In addition, in accordance with another aspect of the present disclosure, the hinge member 22 may be disposed at the upper side of the inner wall 203, and the door 21 may be located in the inner space 24 when pivoted in the direction in which the stick 11 is inserted.

In addition, in accordance with another aspect of the present disclosure, the magnetic sensor 151 may be disposed inside the main body 200 so as to be adjacent to the inner space 24.

In addition, in accordance with another aspect of the present disclosure, the aerosol-generating device may further include a cartridge 300 including a chamber 321 formed between an inner wall 303 thereof and an outer wall 302 thereof to store a pre-vaporized aerosol material. The inner wall 303 of the cartridge 300 may form the insertion space 30 therein, and the cartridge 300 may further include an inner space 34 formed by a region 304 of the inner wall 303 that is recessed in the cartridge 300.

In addition, in accordance with another aspect of the present disclosure, the hinge member 22 may be disposed at a portion at which the inner wall 303 and the outer wall 302 are connected to each other, and the door 21 may be located in the inner space 34 when pivoted in the direction in which the stick 11 is inserted.

In addition, in accordance with another aspect of the present disclosure, the magnetic sensor 151 may be disposed inside the cartridge 300 so as to be adjacent to the inner space 34.

In addition, in accordance with another aspect of the present disclosure, the aerosol-generating device may further include a main body 200 formed to allow the cartridge 300 to be coupled thereto and a cover 230 surrounding at least a portion of the main body 200 and at least a portion of the cartridge 300. A receiving passage may be formed in the upper surface of the cover 230 to cause the insertion space to communicate with the outside. The hinge member 22 may be disposed at the upper surface of the cover 230 so as to be adjacent to the inner peripheral surface of the receiving passage. The door 21 may be located in the inner space 34 when pivoted in the direction in which the stick 11 is inserted.

In addition, in accordance with another aspect of the present disclosure, the aerosol-generating device may further include a heater 211 disposed adjacent to the insertion space 20 and configured to apply heat to the stick 11. In a standby mode, the controller 170 may perform control to interrupt the supply of power to the heater 211. Upon determining that the stick 11 has been inserted into the insertion space 20 using the magnetic sensor 151, the controller 170 may release the standby mode.

In addition, in accordance with another aspect of the present disclosure, the aerosol-generating device may further include a wick 322 disposed adjacent to one end of the insertion space 30 and connected to the interior of the chamber 321 and a heater 310 configured to apply heat to the wick 322. In a standby mode, the controller 170 may perform control to interrupt the supply of power to the heater 310. Upon determining that the stick 11 has been inserted into the insertion space 30 using the magnetic sensor 151, the controller 170 may release the standby mode.

Certain embodiments or other embodiments of the disclosure described above are not mutually exclusive or distinct from each other. Any or all elements of the embodiments of the disclosure described above may be combined with another or combined with each other in configuration or function.

For example, a configuration “A” described in one embodiment of the disclosure and the drawings and a configuration “B” described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An aerosol-generating device comprising:

an insertion space configured to accommodate insertion of a stick;

a door comprising a magnetic portion and configured to cover an opening of the insertion space;

a hinge member coupled to the door and configured to allow the door to be pivoted inward into the insertion space and accommodated in an inner space defined by a recessed portion at the insertion space;

a magnetic sensor disposed adjacent to the inner space and configured to sense a magnetic field of the magnetic portion of the door when the door is pivoted into the inner space; and a controller configured to determine insertion of the stick based on the magnetic sensor sensing the door being pivoted into the inner space.

2. The aerosol-generating device according to claim 1, wherein the hinge member includes an elastic member configured to provide an elastic restoring force to the door towards a closed position.

3. The aerosol-generating device according to claim 1, wherein the insertion space is defined by an inner wall and the hinge member is disposed at an upper region of the inner wall.

4. The aerosol-generating device according to claim 1, further comprising:

a heater disposed adjacent to the insertion space and configured to provide heat to the stick, wherein the controller is configured to:

interrupt supply of power to the heater during a standby mode of the device, and release the standby mode based on detecting insertion of the stick.

5. The aerosol-generating device according to claim 1, further comprising:

a cartridge comprising an inner wall and an outer wall, wherein a chamber is formed between the inner wall and the outer wall and is configured to store a pre-vaporized aerosol material, wherein the inner wall of the cartridge defines the insertion space therein, and wherein the inner wall comprises a recessed portion to define an inner space.

6. The aerosol-generating device according to claim 5, wherein the hinge member is disposed adjacent to a portion at which the inner wall and the outer wall meet, and wherein the door is accommodated in the inner space when fully pivoted into the insertion space.

7. The aerosol-generating device according to claim 5, wherein the magnetic sensor is disposed inside the cartridge so as to be adjacent to the inner space.

8. The aerosol-generating device according to claim 5, further comprising:

a wick disposed adjacent to an end of the insertion space and to be in communication with an interior of the chamber; and a heater configured to provide heat to the wick, wherein the controller is configured to:

interrupt supply of power to the heater during a standby mode of the device, and release the standby mode based on detecting insertion of the stick.

9. The aerosol-generating device according to claim 5, further comprising:

a main body formed to allow the cartridge to be coupled thereto; and a cover covering at least a portion of the main body and at least a portion of the cartridge, wherein a receiving passage is disposed at an upper surface of the cover to allow passage between the insertion space and outside the device, wherein the hinge member is disposed at the upper surface of the cover and adjacent to an inner peripheral surface of the receiving passage, and wherein the door is accommodated in the inner space when fully pivoted into the insertion space.

10. The aerosol-generating device according to claim 9, wherein the magnetic sensor is disposed inside the main body so as to be adjacent to the inner space.

* * * * *